United States Patent
Lu et al.

(10) Patent No.: US 6,219,667 B1
(45) Date of Patent: *Apr. 17, 2001

(54) EFFICIENT LARGE-SCALE ACCESS CONTROL FOR INTERNET/INTRANET INFORMATION SYSTEMS

(75) Inventors: Qi Lu, San Jose, CA (US); Shang-Hua Teng, Champaign, IL (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/086,272

(22) Filed: May 28, 1998

(51) Int. Cl.$^7$ .................................................. G06F 17/00
(52) U.S. Cl. .................................... 707/9; 707/101; 707/6; 707/8
(58) Field of Search ............................. 707/1–206; 702/5; 709/223; 379/201–221

(56) References Cited

U.S. PATENT DOCUMENTS

| | | | |
|---|---|---|---|
| 5,533,107 | * 7/1996 | Irwin et al. | 379/201 |
| 5,537,468 | * 7/1996 | Hartmann | 379/221 |
| 5,544,052 | * 8/1996 | Fujita et al. | 702/5 |
| 5,583,793 | * 12/1996 | Gray et al. | 709/223 |
| 5,764,155 | * 6/1998 | Kertesz et al. | 340/825.08 |

OTHER PUBLICATIONS

J. H. Morris, M. Satyanarayanan, M. H. Corner, J. H. Howard, D. S. Rosenthal, F. D. Smith. Andrew: a distributed personal Computing environment. Communications of the ACM, 29 (3), Mar., 1986.

P. Racer, Web pages number 320 million; search engines overwhelmed. San Diego Union Tribune. Apr. 3, 1998.

Alfred V. Aho, et al., "The Desig and Analysis of Computer Algorithms," Addison–wesley, 1974, pp. 52–55 and 84–86.

Franco P. Preparata et al., "Computational Geometry:An Introduction, Texts and Monographs in Computer Science," Springer–Verlag, 1985, pp. 352–355.

T. H. Cormen et al., "Introduction to Algorithms", The MIT Press, 1994, pp. 485–487.

K. Mulmuley, "Computational Geometry:An Introduction Through Randomized Algorithms," Prentice Hall, 1994, pp. 312–317.

* cited by examiner

Primary Examiner—Thomas G. Black
Assistant Examiner—David Jung
(74) Attorney, Agent, or Firm—Gray Cary Ware & Friedenrich LLP

(57) ABSTRACT

An efficient method and apparatus for regulating access to information objects stored in a database in which there are a large number of users and access groups. The invention uses a representation of a hierarchical access group structure in terms of intervals over a set of integers and a decomposition scheme that reduces any group structure to ones that have interval representation. This representation allows the problem for checking access rights to be reduced to an interval containment problem. An interval tree, a popular data structure in computational geometry, may be implemented to efficiently execute the access-right checking method.

57 Claims, 15 Drawing Sheets

EFFICIENT LARGE-SCALE ACCESS CONTROL FOR INTERNET/INTRANET INFORMATION SYSTEMS

BACKGROUND OF THE INVENTION

1. Field of the Invention

The present invention relates to regulating access to data objects contained in a database. More particularly, the invention concerns integer interval based access control enforcement.

2. Description of the Related Art

As the Internet has become a social infrastructure for data sharing and information management, the need to process and classify a large amount of diverse information resources within an enterprise, and make them available to a large set of "diverse" users has increased. Potential problems and the diversity of the applications make it necessary to re-examine some kernel problems, such as access control, data retrieval, and resource management. These problems have been central to traditional operating systems and large scale databases, and more efficient and scalable solutions need to be discovered.

The Internet is a complex environment where information is distributed across the Internet's infrastructure. Some information such as technology secrets and personal records is sensitive and should only be accessible to a select group of users depending on their right for information access. Access control determines which users are allowed to access certain information.

In many information management systems, such as the IBM Grand Central Station (GCS), an expedient "group" based access control model is used to specify which user can access which object. In such a model, each user belongs to one or more access groups and each information object is accessible only to certain set of groups. For example, sensitive personnel information is only accessible to members of the Personnel Managers group. In general, there is a hierarchial structure defined over the access groups. For example, Personnel Managers may be a subgroup of Group Manager, which means that it is a more restrictive group. The access control problem, in this setting, is to determine whether the group membership will allow a user to access a protected information object according to this group based access control model.

Group based access models have been used in the Andrew File System (AFS, developed at Carnegie Mellon University, see J. H. Morris et al., "Andrew: a Distributed Personal Computing Environment," *Communications of the ACM,* 29 (3), March 1986 for accessing in a shared file system, and in various operating systems and database systems. These models work well for databases having a smaller number of objects, groups, and users, and generally provide solid real-time response for information requests.

However, what is needed in an "interval" access method that can be applied to the enormous database comprising information available over the Internet. The method should be capable of handling very large numbers of objects, groups, and users, larger than could reasonably be handled by current group based access models. The method should also provide superior real-time response to an information request as compared to current methods.

SUMMARY OF THE INVENTION

Broadly, the present invention relates to efficiently regulating access to data objects contained in a database. More particularly, the invention concerns an integer interval based access control method and apparatus that allows groups and sub-groups access to designated data objects stored in a server unit accessed through the Internet.

The present invention addresses an access control problem for information processing over the Internet, providing an efficient solution for handling large scale access patterns, data objects and users.

In one embodiment, the method uses a representation of a hierarchical access group structure in terms of intervals over a set of integers, and a decomposition scheme that reduces any group structure to ones that have interval representation. This representation allows the problem for checking access rights to be reduced to an interval containment problem. An interval tree may be used to assist in efficiently solving the access-right checking problem.

In one embodiment, the invention may be implemented to provide a method to regulate access to a system's database using interval containment control. In this embodiment, a group of members $g_m$ is allowed access to a data object contained in a database. For example, the members may be selected employees of the database owner that are allowed access to the secured data, or they may be visitors to an Internet site that have paid a fee to gain access to the database objects. For each group $g_m$ allowed access, a first interval value is mapped to the group. If a user U—contained in a group $g_n$ mapped to a second interval value—desires access to the data object accessible by $g_m$, U may only gain access if the second interval mapped to $g_n$ is contained within the first interval mapped to $g_m$.

For example, if each group is mapped to an integer interval value, wherein b' and e' are integers defining the first interval and $b' \leq e'$, and wherein b and e are integers defining the second interval and $b \leq e$, the second interval is contained within the first interval if ($b' \leq b \leq e \leq e'$). The mapping of integral values to groups is discussed below in detail.

In another embodiment, the invention may be implemented to provide an apparatus to implement the interval based access control method that allows designated users access to designated objects stored in a database. One version of the apparatus may include at least one client computer, an index unit, a web server, a database, and a file server all communicatively linked together. Storage and digital data processors are known to be commonly included in one or more of the above, and may be used to execute the steps of the method described above.

In still another embodiment, the invention may be implemented to provide an article of manufacture comprising a data storage medium tangibly embodying a program of machine-readable instructions executable by a digital data processing apparatus to perform method steps for regulating access to stored data objects using an integer interval based access control method. The data storage medium may be communicatively connected to the apparatus described above and the program contained thereon may be used to direct the apparatus as desired.

The invention affords its users with a number of distinct advantages. One advantage is that the invention provides a reduction in computation costs over commonly used group-based access control methods. This reduction in overhead allow fewer system resources to be dedicated to performing the access analysis. Another advantage is that the invention allows faster access to an object by a user due to the reduced computation costs. Yet another advantage is that the invention can handle enormous numbers of objects, groups, and users, larger than could be reasonably handled using current methods. The invention also provides a number of other advantages and benefits, which should be apparent from the following description of the invention.

BRIEF DESCRIPTION OF THE DRAWING

The nature, objects, and advantages of the invention will become more apparent to those skilled in the art after considering the following detailed description in connection with the accompanying drawings, in which like reference numerals designate like parts throughout, wherein.

DETAILED DESCRIPTION OF THE PREFERRED EMBODIMENTS

Operation

FIGS. 1–13B illustrate examples of method aspects of the present invention. For ease of explanation, but without any limitation intended thereby, these examples are described in the context of a digital signal processing apparatus, one example of which is described following the discussion of the various method embodiments.

1. Hierarchical Model for Access Groups in General

In an Internet environment, a set comprising a large number of users, $\{u_1, u_2, \ldots, u_n\}$, may want access to certain information data objects (objects). The present invention uses an interval access control model in one embodiment to specify which object can be accessed by which user. But first, the hierarchial construction of a DAG or a "tree" created for the data objects will be discussed, followed by various interval representations for user groups.

Figure 1:
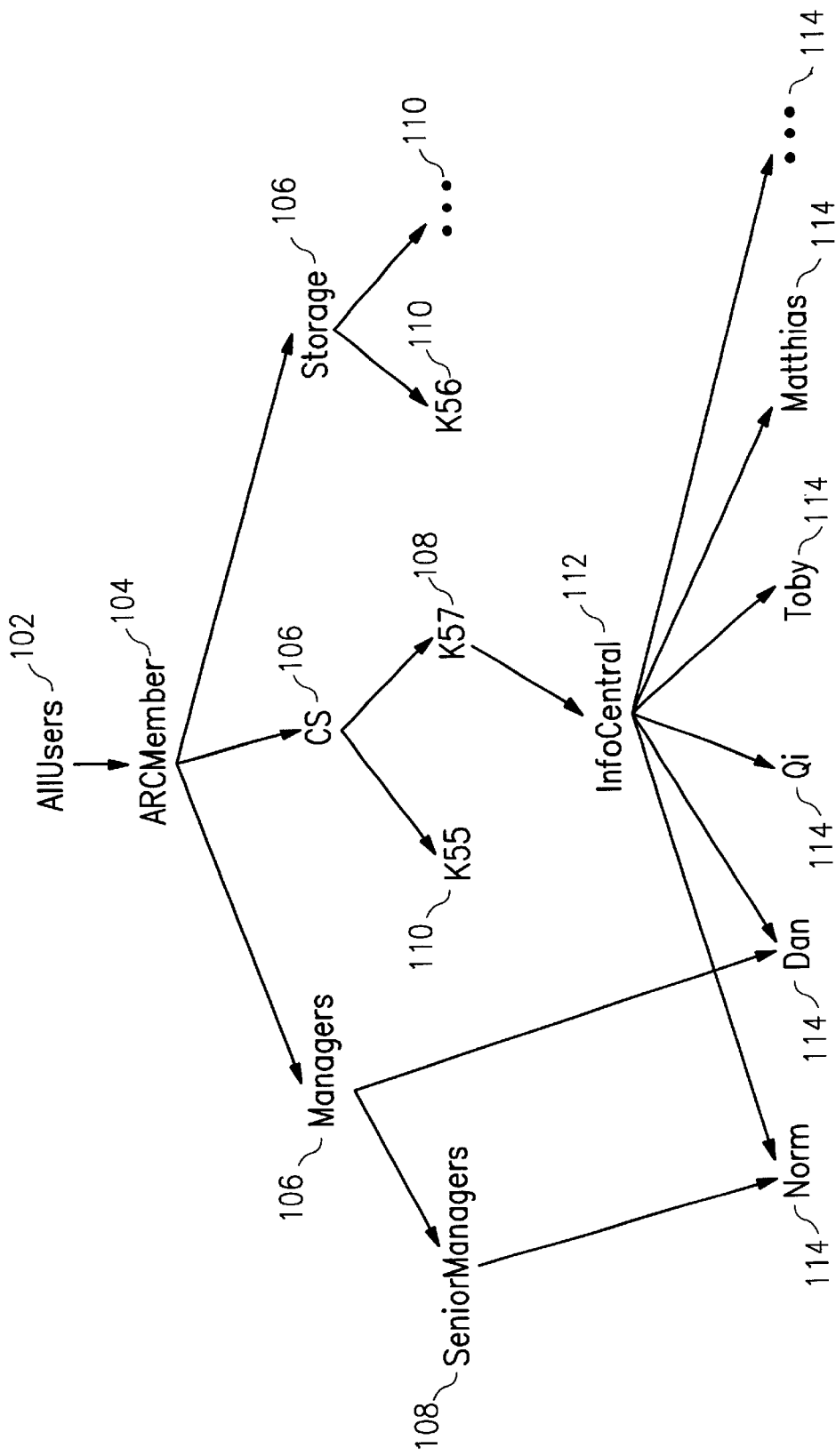
FIG. 1 is a mapping of a directed acyclic graph (DAG) for a group partial order.

FIG. 1 shows one example of a directed acyclic graph (DAG) used to define objects or groups and subgroups. AllUsers 102 comprises the root of the hierarchial DAG. A sub-group of AllUsers 102 is an internal node ARCMember 104 that has subgroups represented as nodes 106. These nodes 106 have subgroups that are either other internal nodes 108 or leaves 110. Similarly, the nodes 108 have additional subgroups that are either internal nodes 112 of leaves 114. This structuring is discussed in greater detail below. Generally speaking, all of the leaves and internal nodes shown in FIG. 1 are a subgroup of the root AllUsers 102, and are potential users who may demand access to a database. Every user belongs to one or more groups. The group membership may be determined by the position of a user in an organization, projects in which he/she is involved, or the amount of money that he/she is paying to maintain the right for information access in an information service system.

This group-based DAG includes a collection of access groups $\mathbf{G} = \{g_1, g_2, \ldots, g_M\}$. There is a partial order $<_g$ among these access groups that can be expressed as a DAG over this set of access groups as shown in FIG. 1. Call this graph GROUP. For example, if $g_j >_g g_i$ is in this partial order, then the access group $g_j$ is more restrictive and less exclusive (prestigious) than $g_i$. In this case, there is a directed edge $(g_i, g_j)$ from $g_i$ to $g_j$ in the access graph GROUP. In FIG. 1, $g_i$ is represented by AllUsers 102 and $g_j$ is represented by a leaf 114, such as Norm 114.

Therefore, let MEMBERSHIP$(u_i) \subseteq \mathbf{G}$ denote the set of groups that a user $u_i$ is a member of. MEMBERSHIP$(u_i)$ is reduced in the sense that if $g \in$ MEMBERSHIP$(u_i)$ and $h \in$ MEMBERSHIP$(u_i)$, then neither $g <_g h$ nor $h <_g g$. But if every object O may be accessible to one or more groups, let ACCESS(O) be this set of groups. In other words, the right to access object O is assigned to and only to a group that belongs to ACCESS(O). For example, a group g can access O if and only if there exists $h \in$ ACCESS(O) such that $g >_g h$, where ACCESS(O) is reduced.

Given the above, a basic access control problem in one embodiment can be determined by whether u can access O, i.e., whether there exist $g \in$ MEMBERSHIP(u) and $h \in$ ACCESS(O) such that $g >_g h$, where u is a user and O is an object.

The access control problem for pulling an information object can be determined where, having a set of objects $O_1, O_2, \ldots$ in a pulling system, and given a user u, determining which objects can be accessed by u, (i.e., for each i) and deciding whether there exists $g \in$ MEMBERSHIP(u) and $h \in$ ACCESS$(O_i)$ such that $g >_g h$.

The access control problem for a single push step in an information pushing system can be determined having a set of users $u_1, u_2, \ldots$ in a push system, and given an object O, determining which user can access O, (i.e., for each i) and deciding whether there exists $g \in$ MEMBERSHIP$(u_i)$ and $h \in$ ACCESS(O) such that $g >_g h$.

Due to the scale of Internet, there are a large number of users, groups and objects. Being able to efficiently check access control rights is a critical part of search performance. The present invention implements an efficient representation of the access-group hierarchy that can be used for real-time access-right checking.

2. Interval Representation of Access Groups

In this section, one method of the present invention implements an efficient representation for access control when a group structure satisfies certain conditions. This representation scheme expressed each group as an interval of integers.

An interval over the set of integers is given as [b,e] where $b \leq e$ and both are integers. An interval [b,e] is contained in another interval [b',e'] if $b' \leq b \leq e \leq e'$. In this case, the relationship may be expressed as $[b,e] <_I [b',e']$.

For certain group structures, each group can be mapped to an interval over integers so that this hierarchical relation of the group partial order is preserved. In other words, let $G = \{g_1, g_2, \ldots g_M\}$ be a set of groups, where $\pi$ is a map from z,900 to intervals over integers. Then $\pi$ respects the group partial order (w.r.t.), where w.r.t.$<_G$ of GROUP, if and only if for each pair of groups g, h $\in$ z,900, $g <_G$ h if and only if $\pi(g) <_I \pi(h)$. On the other hand, $\pi$ respects the group partial order w.r.t.$>_G$ of GROUP if for each pair of groups g, h $\in$ G, $g <_G$ h if $\pi(g) <_I \pi(h)$.

2.1 Interval Map for a Tree Hierarchy

Let T be a directed rooted tree where the root represents the group with the least prestigious group and the children of the root are the least prestigious groups of their respective sub-trees. A node of T is a leaf if it has no child of its own.

Figure 2:
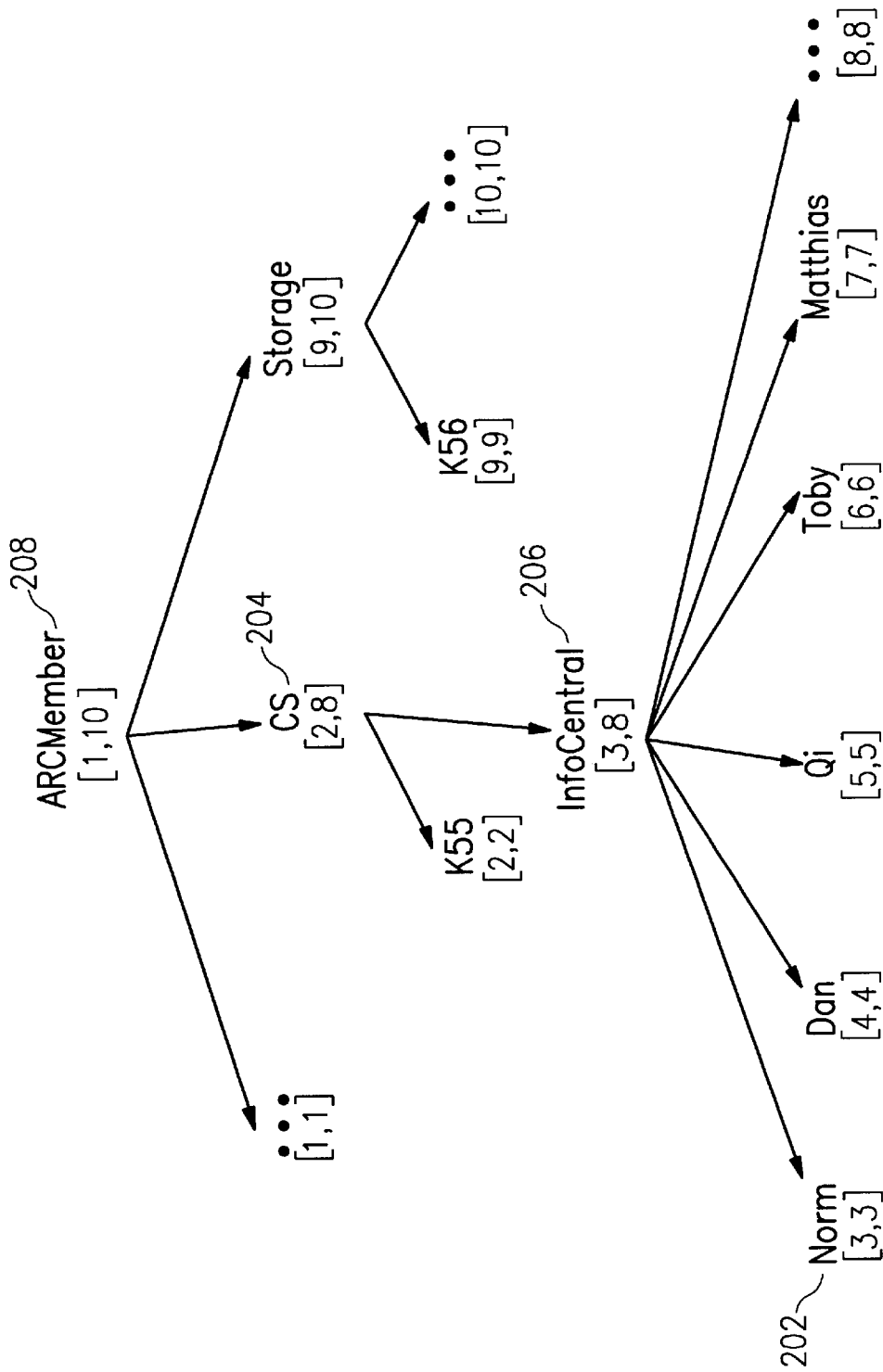
FIG. 2 illustrates a mapping of a tree partial order shown as an integral map.

A node of T is mapped to intervals that respect the group partial order w.r.t.$>_G$. The map may be constructed in one embodiment by building the in-order labeling of the leaves of the tree. In-order labeling of the leaves of a tree is known to those schooled in the art, and is discussed in numerous texts, such as that in A. Aho et al., "The Design and Analysis of Computer Algorithms," Addison-Wesley, 1974. If the tree has k leaves, in-order labeling assigns leaves in the tree—going from left to right—an integer in the interval represented as [1,k]. In the example of FIG. 2, leaf Norm 202 receives a 3, because it is the third leaf from the left, where left is counted from the top of the map down the left hand side for each leaf. This in-order labeling defines an interval for all leaves. The ith leaf will get interval [i,i]. Intervals to internal nodes are also assigned. For each internal node u, such as CS node 204, all leaves lie in a consecutive interval of integers. For example, the leaves of InfoCentral 206 range from 3 to 8. In this case, [3,8] is assigned to this internal node. The root, shown as ARCMember 208 in FIG. 2, will receive [1,k] which is the largest interval assigned to a tree node. Notice that root represents the least prestigious group because it contains all groups and users within the map.

2.2 Interval Map for an iDAG

Given a collection of intervals $I = \{I_1, \ldots, I_n\}$, a DAG $G_I$ can be defined whose vertex set is I and where there is an edge from $I_i$ to $I_j$ if $I_i$ contains $I_j$. In this case, I is an interval map of $G_I$ and the set of all such $G_I$ are called iDAGs. As discussed below in Section 4, no all DAGs are iDAGs.

Topological ordering of a DAG is well known in the art as exemplified in T. H. Comen et al., "Introduction to Algorithms," The MIT Press, 1994. For a DAG G, assuming G has a single source and a single sink—where a source is a node whose-in-degree is equal to 0 and a sink is a node whose out-degree is 0—the invention orders G as follows. A node ordering $\phi$ of the DAG assigns each node v in G an integer $\phi(v)$, where $\phi$ is a topological ordering for each pair of nodes u and v. If u is reachable for v in the DAG G, then $\phi(u) > \phi(v)$. In any topological ordering, the source will receive the smallest integer while the sink will receive the largest integer.

Figure 3:
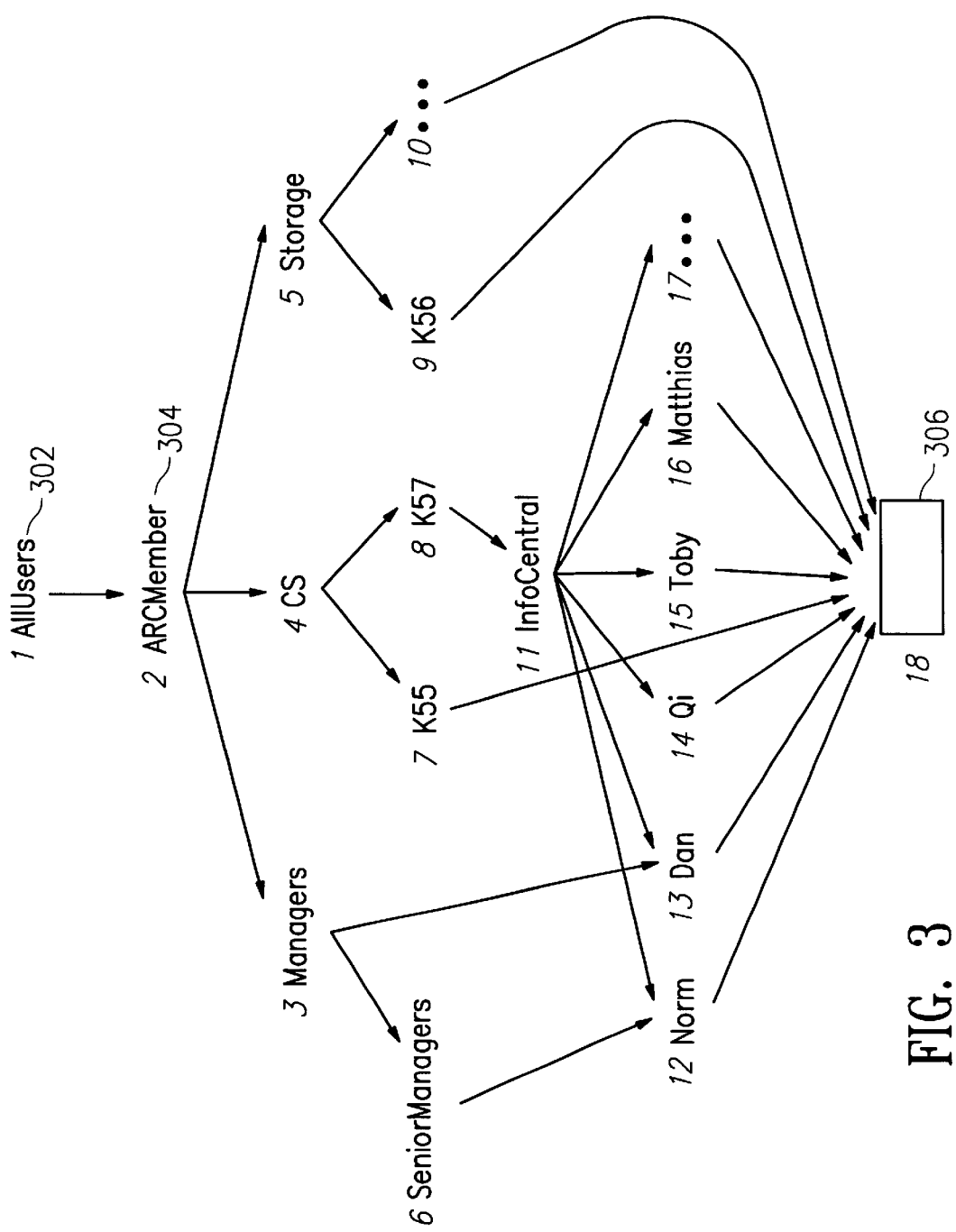
FIG. 3 shows a topological ordering for a DAG.

For example, FIG. 3 shows the assignment of integers as discussed above. Integers are assigned from top to bottom and from left-to-right as shown. A node AllUsers 302 is a source and is assigned a smallest integer, the integer 1, in the DAG. A node 18, shown as a box in FIG. 3, is a sink for the DAG and is assigned a highest integer value for the DAG, the number 18. Intermediary nodes, such as ARCMember 304, are assigned values from 2 through 17. Obviously, the greater the number of intermediary nodes contained in a DAG, the greater the integer value assigned to node 306.

As shown in FIG. 3, if $I = \{I_1, \ldots, I_n\}$, where I is be an interval map for an iDAG $G = (V = \{1, \ldots, n\}, E)$, then $I_j$ is an interval for vertex j and the left-ends of I is a topological ordering of the vertices in G.

Further, a DAG may have as many as an exponential number of topological orderings. In addition, for an iDAG, not all topological orderings can be used as left-ends for an interval map. A discussion of one embodiment of the invention, when topological orderings and left-ends can be used for an interval map, follows.

The method discussed below sets the right-end $\rho$ of an interval map so that the partial order is respected when possible. Right-end integers are set at larger values than any integer used in the topological ordering. In this embodiment, the right-end of intervals $\rho$ values satisfy the following two conditions:

1. If $u >_G v$, then the right end of u ($\rho(u)$) is less than that of v ($\rho(v)$). If true, then the interval of u will be contained in that of v as desired, because in a topological ordering $\phi, \phi(u) > \phi(v)$; and
2. If neither $u <_G v$ nor $v <_G u$ (i.e., they are not comparable) then $\rho$ (u) is less than $\rho$ (v) whenever $\phi(u) < \phi(v)$. Otherwise, the interval of u will be contained in that of v, and contradict the fact that u and v are independent in the partial ordering.

Condition (1) above implies that $\rho$ must be a topological ordering for the transpose of DAG G denoted by $G^T$, which is a DAG obtained by reversing the direction of each edge in G. Notice that in this transpose, the source becomes the sink and the sink become the source. In other words, the transpose of the partial order over G' can be obtained from the partial order by interchanging the role of $<_G$ and $>_G$.

Figure 4:
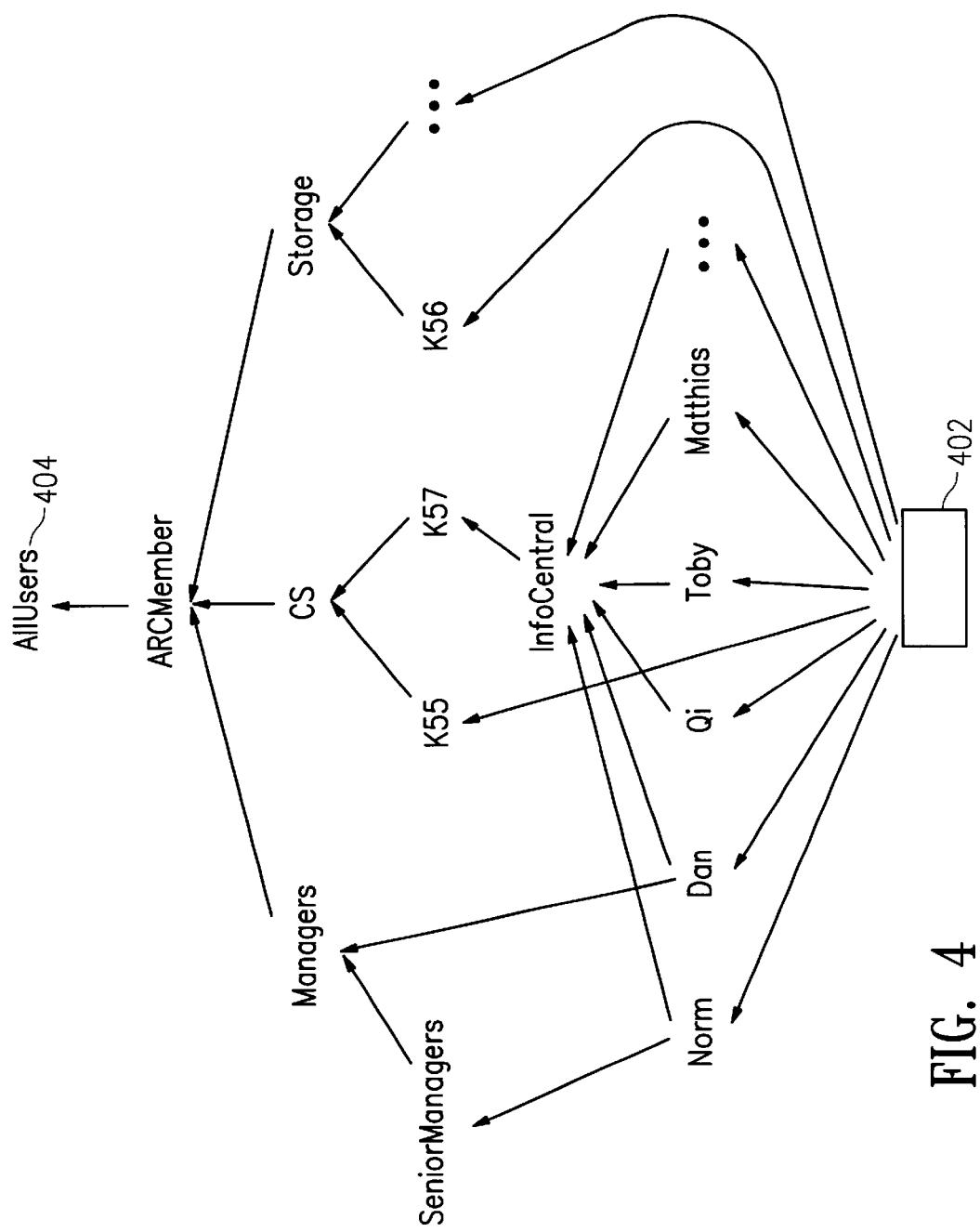
FIG. 4 shows a transpose of the DAG of FIG. 3.

FIG. 4 shows the transpose of the DAG illustrated FIG. 3. A source, node 402, shown in FIG. 4 was identified as the sink node 316 in the non-transposed DAG of FIG. 3. The sink, node 404 of FIG. 4, was identified as the source node 302 of the non-transposed DAG of FIG. 3. The integer value assigned to the intermediary nodes changes accordingly.

In one embodiment, if a topological ordering for G can be used as left-ends for an interval map, then there is a unique topological ordering $G^T$ that satisfied Condition (2) as well. For example, a directed graph H over G may be defined from $G^T$ and $\phi$ where for each pair of nodes u and v that are comparable in G, if $u <_G v$, then H contains the directed edge (u, v). Otherwise, H contains the directed edge (v, u). For each pair of nodes u and v where neither $u <_G$ v nor $v <_G$ u, if $\phi(u) < \phi(v)$, then H contains the directed edge (v, u). Otherwise, H contains the directed edge (u, v). Accordingly, if H is a DAG, then H defines a linear ordering that is a topological ordering of $G^T$ and that satisfied condition (2).

If an interval-map is to be constructed, the embodiment of the method may take a partial order over groups given as a DAG G and a topological ordering of $\phi$ of G and construct an interval map that respects the partial order w.r.t.$>_G$.

Figure 5:
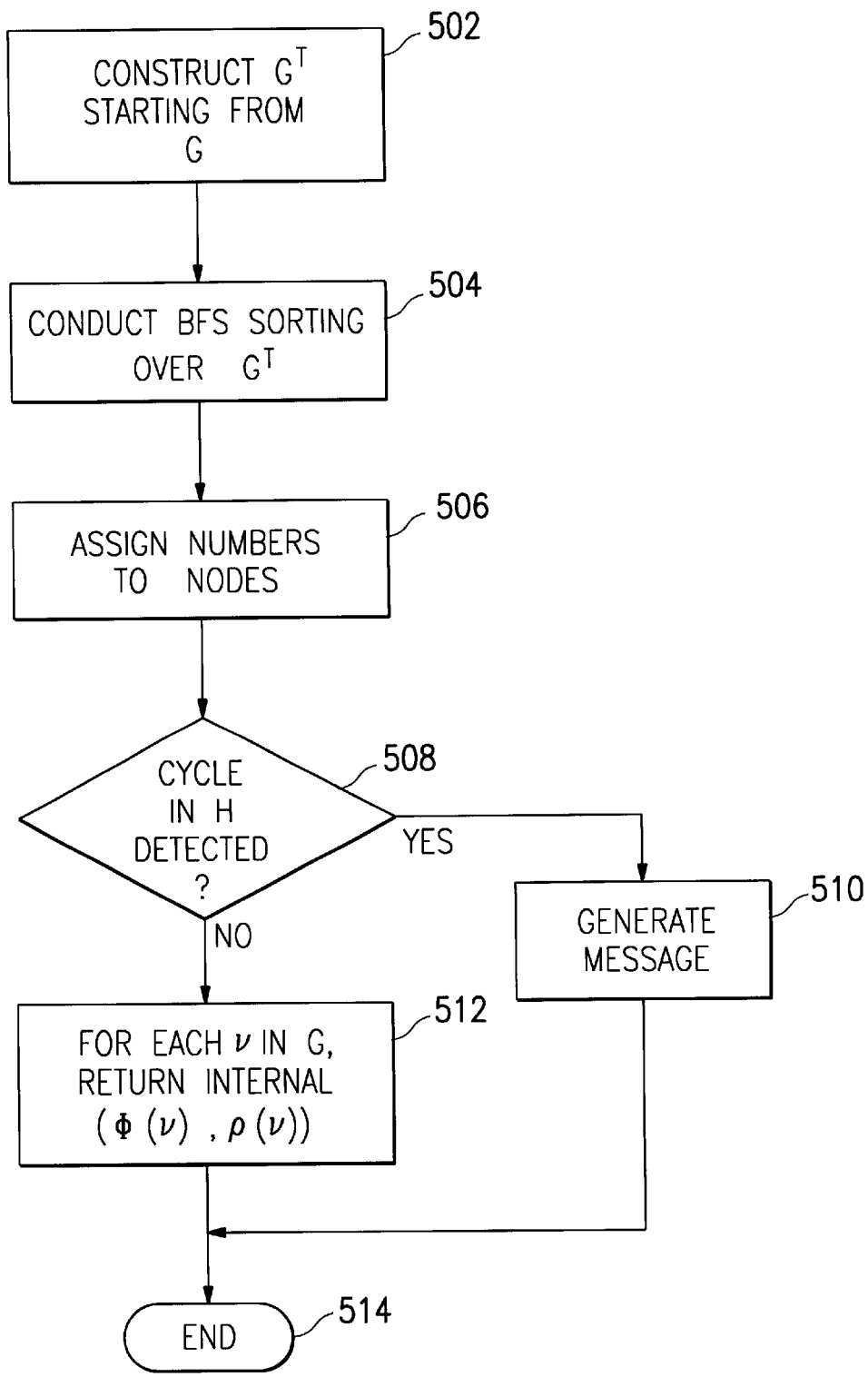
FIG. 5 is a flow diagram for a construct of an interval map.

As shown in FIG. 5, the method performs the following tasks 502–514:

1. Construct $G^T$ starting from the sink of G;
2. Apply a breadth-first search (BFS) based topological sorting over $G^T$. The first number used will be |G|, and assigned to a sink. The BFS maintains a queue of nodes in $G^T$ to be searched. Initially, the queue contains the sink of G. In the BFS search, the element in the queue that has the smallest $\phi$ number will be chosen first. Each node v receives a number ρ(v) according to the order of the visit. If a cycle in H is detected, a message that φ can not be used in an interval map is generated and the method ends; and 3. For each node v in G, the interval (φ(v), ρ(v)) is returned.

Figure 6:
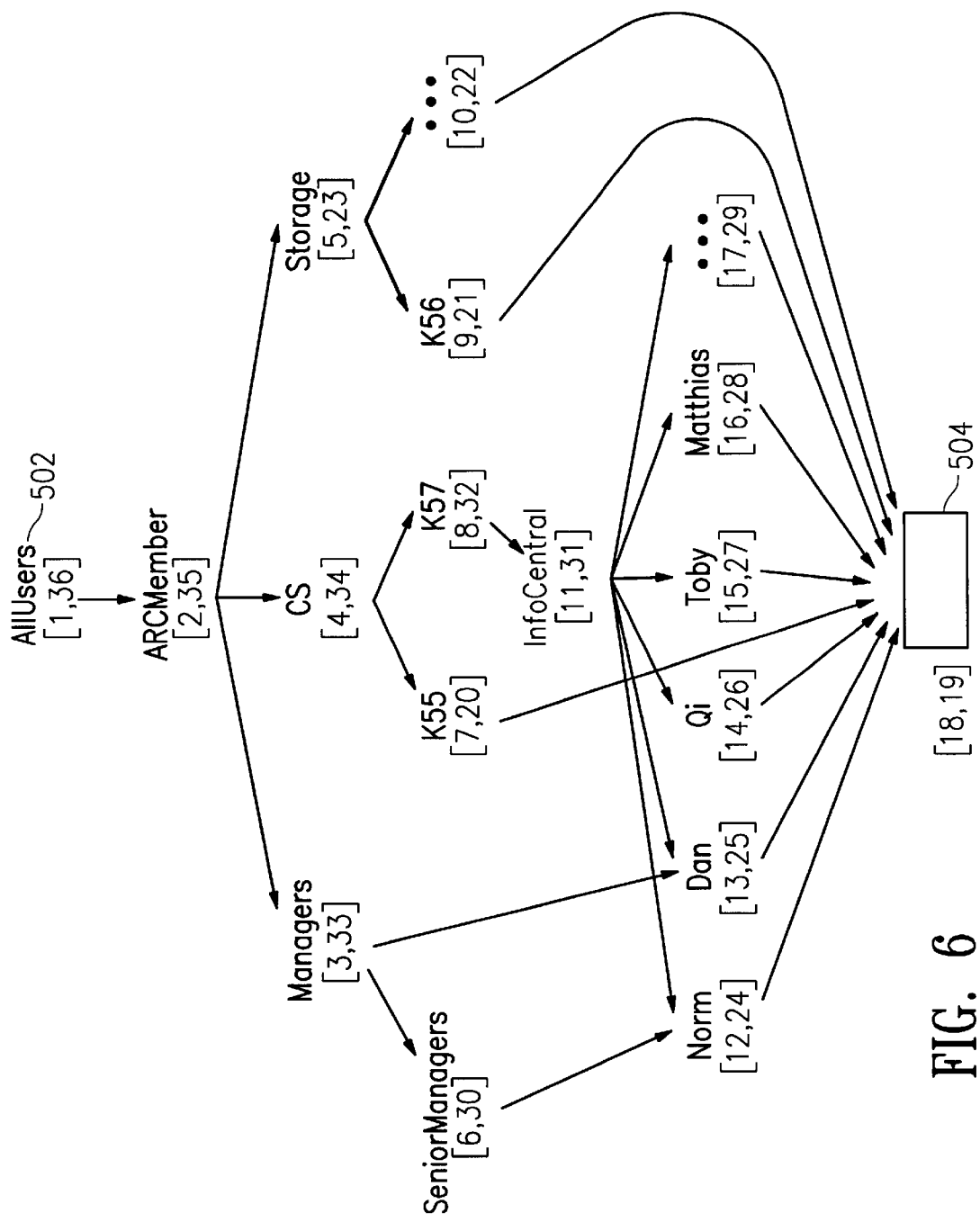
FIG. 6 is an interval mapping for a DAG.
Figure 7:
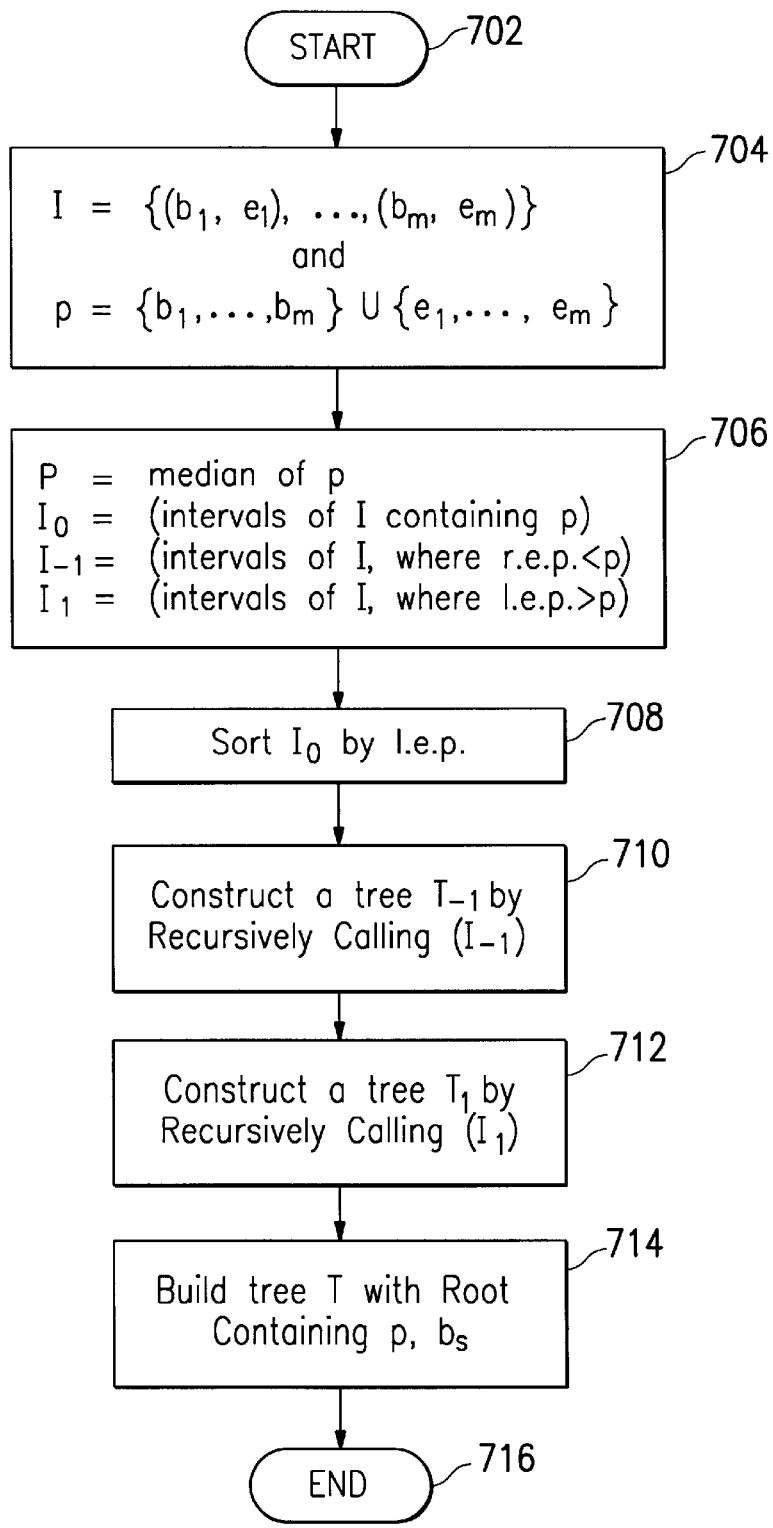
FIG. 7 is a flow diagram for constructing an interval tree.
Figure 8:
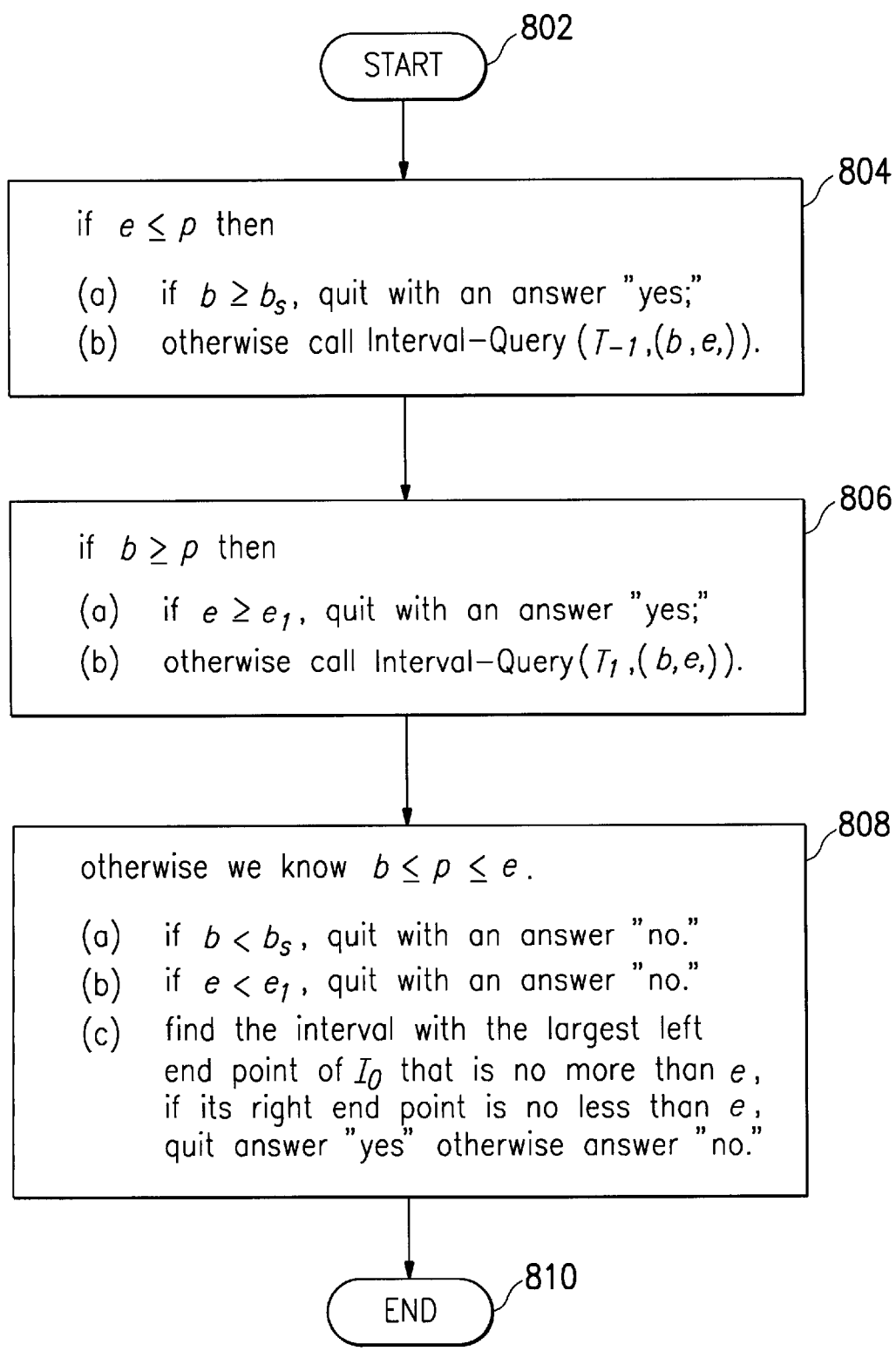
FIG. 8 is a flow diagram for conducting an interval query in accordance with one embodiment of the present invention.

The method, in one embodiment, takes a time proportional to the size of G, because a time dominant task of the method is performing the BFS. FIG. 6 shows the interval map constructed by practicing the method described above. A node AllUsers 502 is a source node for a DAG shown and receives an integer value of (1,36). A node 504 is a sink node for the DAG, and is assigned an integer value of (18,19).

Because the transpose of a DAG of a partial order interchanges the role of <𝒈 and >𝒈, the above method can be used to generate a representation that respects the partial order w.r.t.<𝒈.

3. Query with Interval-Maps for iDAGs

If a group structure is an iDAG, its interval representation can be used to reduce an access control problem to an interval containment checking problem. To do so, one embodiment of the method restructures the access groups in terms of these intervals.

In this method, a collection of access group intervals $G_I$ may be represented as $\{I_1, \ldots, I_M\}$. Each user u has a membership set MEMBERSHIP(u) which are collection intervals from $G_I$. MEMBERSHIP(u) is reduced so that no interval is contained in any other interval. As expected, each information object O that has a set of intervals ACCESS(O) is also reduced.

With the help of an interval-map as discussed in Section 2.2, the basic access control problem for iDAG group structure may be reduced to any of the following equivalent interval containment problems.

Version I

Given a user u and an object O, if any interval in MEMBERSHIP(u) is contained in some interval in ACCESS(O), then u is given access; and Version II Given a user u and an object O, if any interval in ACCESS(O) contains same intervals in MEMBERSHIP(u), then u is given access.

In the present invention, an interval-tree may be constructed where $I=\{(b_1, e_1), \ldots, (b_m, e_m)\}$, where I is a set of m intervals $(b_1, e_1)$ through $(b_m, e_m)$. As shown in tasks 702–716 of FIG. 7, an interval-tree, also known as a binary tree, can be constructed by allowing $P=\{b_1, \ldots, b_m\} \cup \{e_1, \ldots, e_m\}$, and then:

1. Let p be the median of P;
2. Let $I_0$ be the set of intervals of I that contain p;
3. Let $I_{-1}$ be the set of intervals of I whose right end points (r.e.p.) are smaller than p;
4. Let $I_1$ be the set of intervals of I whose left end points (l.e.p.)are larger than p;
5. Because I is reduced, sort $I_0$ by its left end point, thereby sorting its right end point as well;
6. Let $T_{-1}$ be the tree constructed by recursively calling Interval-Treeon $(I_{-1})$;
7. Let $T_1$ be the tree constructed by recursively call Interval-Tree on$(I_1)$;
8. Build a tree T whose root contains p, $b_S$ (the smallest left end point in $I_0$ and where $e_1$ is the largest right end point of $I_0$, and a complete binary tree for the left end point of $I_0$.) T has two children, the left one is $T_{-1}$ and the right one is $T_1$.

It follows from the above reconstruction that this data structure takes O(m) space. Moreover, the height of the tree is O(log m). If (b,e) is a given interval, and it needs to be determined whether (b,e) is contained in any intervals in I, the following procedural tasks shown in FIG. 8 may be followed in one embodiment:

Interval-Query(T,(b,e))

1. if $e \leq p$ then
   (a) if $b \geq b_S$, quit with an answer "yes;"
   (b) otherwise call Interval-Query($T_{-1}$,(b,e)).
2. if $b \geq p$ then
   (a) if $e \geq e_1$, quit with an answer "yes;"
   (b) otherwise call Interval-Query($T_1$,(b,e)).
3. otherwise we know $b \leq p \leq e$.
   (a) if $b < b_S$, quit with an answer "no."
   (b) if $e < e_1$, quit with an answer "no."
   (c) find the interval with the largest left end point of $I_0$ that is no more than e, if its right end point is no less than e, quit answer "yes" otherwise answer "no."

These tasks answer an interval containment query Version I in O(log m) time. A similar interval data structure for answering an interval containment query of Version II in O(log m) time may also be constructed by one schooled in the art after reading the above disclosure.

4. A Decomposition Method for Access Control

This section discusses a method to decompose any group structure into a collection of simpler group structures to which interval representation of an access group, as discussed above, can be applied. Decomposition may be necessary because not every DAG is also an iDAG.

Given an access control DAG G, G may be decomposed into a collection of simple DAGs $G_1, \ldots, G_I$ such that $G_I$'s are simpler and structured enough so that an efficient access structure can be built, such as interval-maps. To answer a query of "whether a group membership g can access a set A of groups," g is mapped to one of the sub-graphs, and then the access structure of that sub-graph is used to answer the query. The present invention may use different types of "efficient" query structures, two of which are: (1) interval-maps for an iDAG; and, (2) a hashtable that lists all groups that can access a particular group. The performance of the decomposed query structure may depend on the quality of the decomposition, and the interaction among $G_i$'s and the number of hashtables for direct access testing is preferably small.

4.1 iDAG Decomposition

Figure 9B:
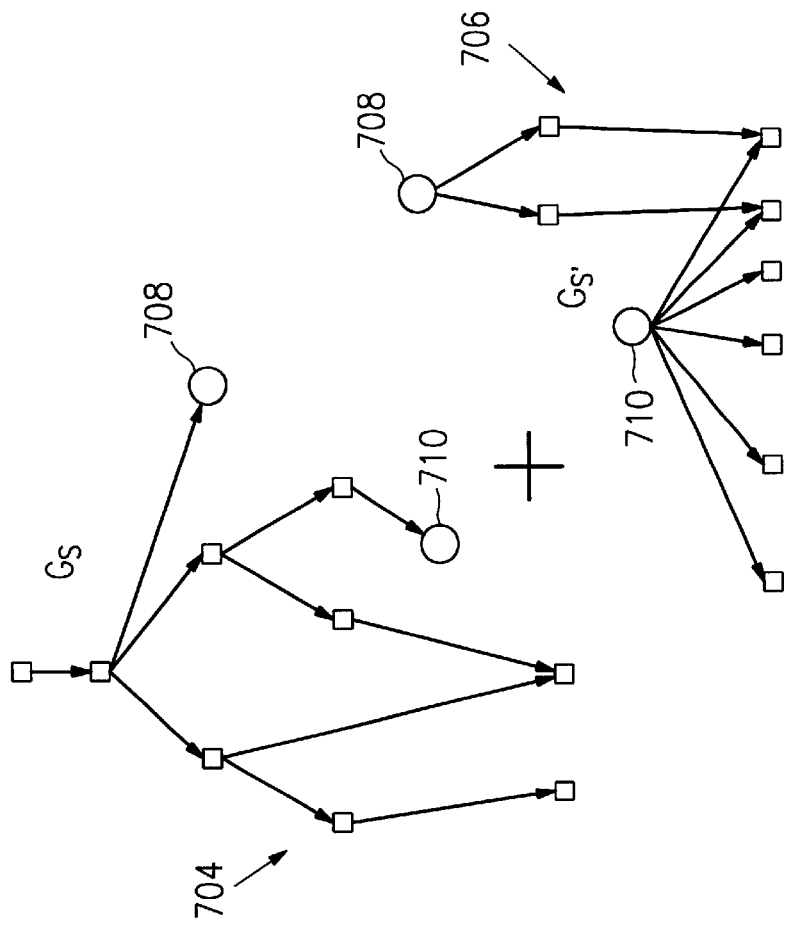
FIGS. 9A and 9B show interface vertices in a DAG that has undergone a decomposition in accordance with one embodiment of the present invention.
Figure 9A:
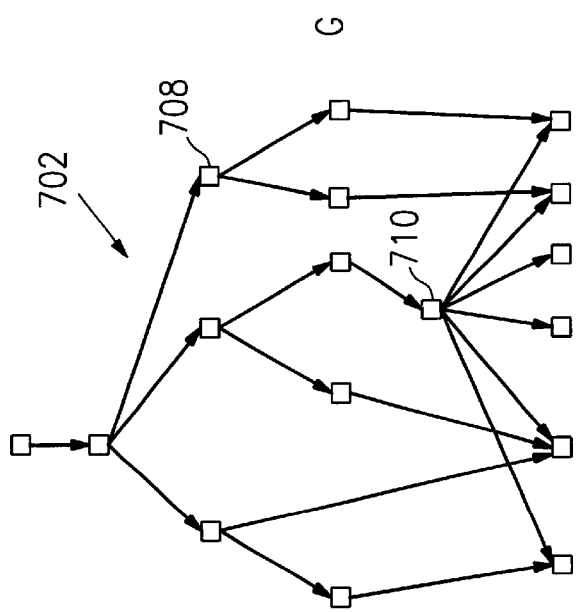

One example of an application of the method for decomposition follows and may be further understood by referring to FIGS. 9A and 9B. In this example, G=(V,E), where G is a DAG 702 shown in FIG. 9A. If a subset $A \subseteq V$ of vertices, and a query is posited as to whether or not "a given vertex $v \in V$ can reach A," the following definitions apply in this example.

If $S \subset V$ is a subset of vertices, then S divides the vertices in V into three subsets in this embodiment. The subsets are: (1) $N_S$, representing a set of all vertices that are not reachable from any vertex from S; (2) $J_S$, representing the set of all vertices that are reachable from some vertices in S as well from some vertices from V—S by a path that does not contain any vertex in S; and,(3) $B_S$, representing the set of all vertices not in $J_S$ that are reachable from some vertices in S. Note that $R_S=J_S \cup B_S$ is the set of all vertices that are reachable from S and $G_S$ a DAG induced by vertices in $R_S$ and $G'_S$ is the DAG induced by vertices in $N_S \cup J_S \cup S$ in which S is a leaf, where S is the interface between $G_S$ and $G'_S$.

FIG. 9B shows how the DAG G 702 of FIG. 9A is decomposed into a pair of iDAGs $G_S$ 704 and $G_{S'}$ 706 based upon the above relationships. DAG 702 is shown having two interface vertices 708 and 710. Upon decomposition, the DAG G 702 is decomposed into two DAGs, each of which is shown in relation to the interface vertices 708 and 710.

Generally, for DAG decomposition, the following is true: for any subset $S \subset V$, and any subset $A \subseteq V$, $A_S \subseteq S$ is the set of all vertices in S that can reach some vertices in $A \cap R_S$. For any vertex $v \in V$, v can reach A if and only if $v \in R_S$ and v can reach $A \cap R_S$. or if $v \in N_S$, can reach $(A \cap (N_S \cup J_S)) \cup A_S$.

Figure 10:
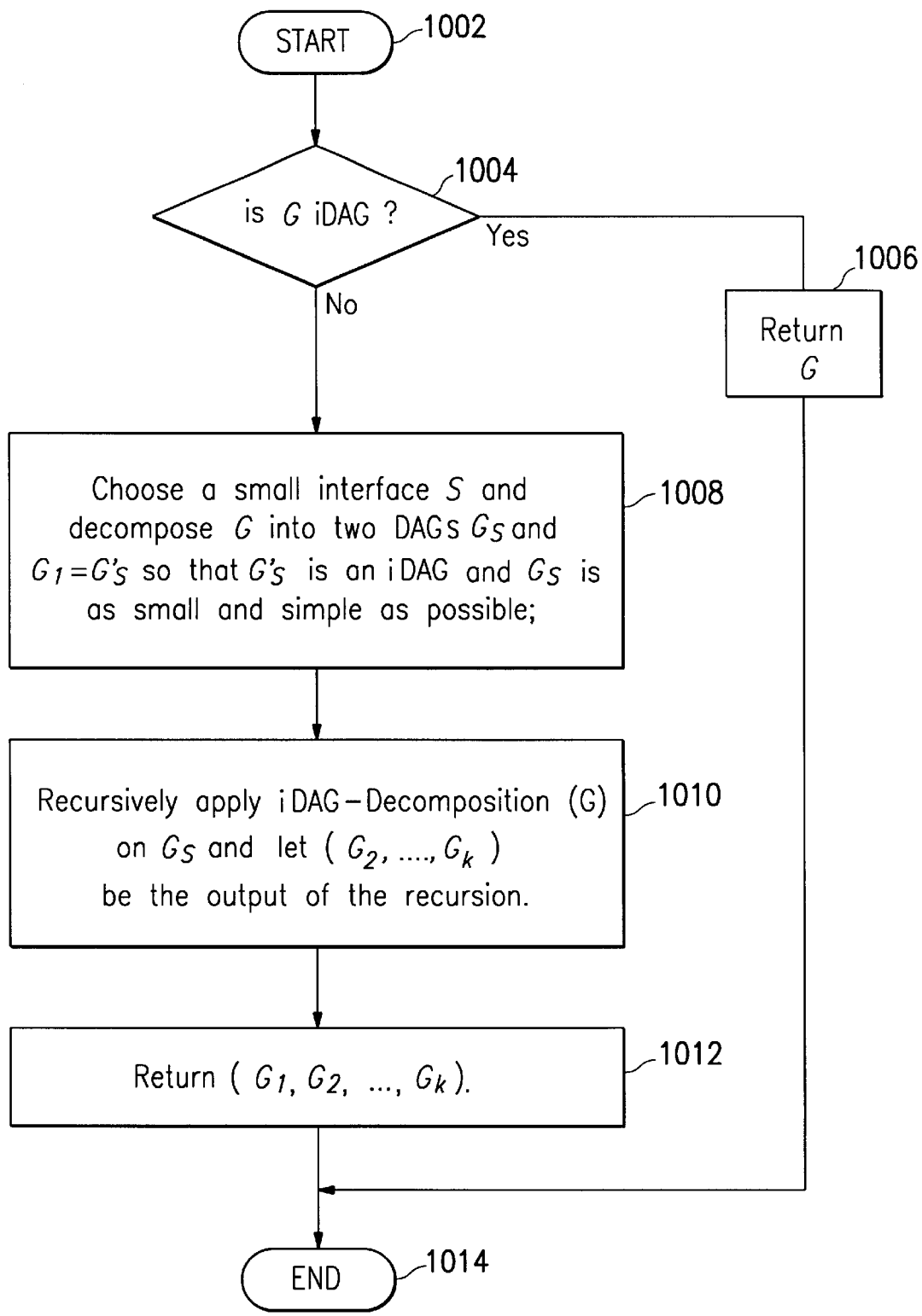
FIG. 10 is a flow diagram showing an iDAG decomposition method in accordance with one embodiment of the present invention.

In the case when the graph of access groups is not an iDAG, the decomposition method shown in tasks 1002–1014 of FIG. 10 may be applied:
Method iDAG-Decomposition(G)
1. If G is an iDAG, return G; else
2. Choose a small interface S and decompose G into two DAGs $G_S$ and $G_1 = G'_S$ so that $G'_S$ is an iDAG and $G_S$ is as small and simple as possible;
3. Recursively apply iDAG-Decomposition (G) on $G_S$ and let $(G_2, \ldots, G_k)$ be the output of the recursion;
4. Return $(G_1, G_2, \ldots, G_k)$.

This version of a recursive decomposition defines a linear order among the resultant iDAGs where $G_i$ is above $G_{i+1}$. Let $S_i$, for $i=1, \ldots, k$ be the interface used to generate iDAG $G_i$, also let $R_i$ be the set of vertices of $G_i$. An interval-may for $G_i$ is generated for each i in the range $1 \leq i \leq k$ where each vertex in $R_i$ receives an interval. For each vertex $v \in V$, let $i_v$ be the largest index such that $R_{i_v}$ contains v. An "identity" of v (identity(v)) will be $(i_v, I_v)$, where $I_v$ is the interval assigned to v in $G_{i_v}$.

Figure 11:
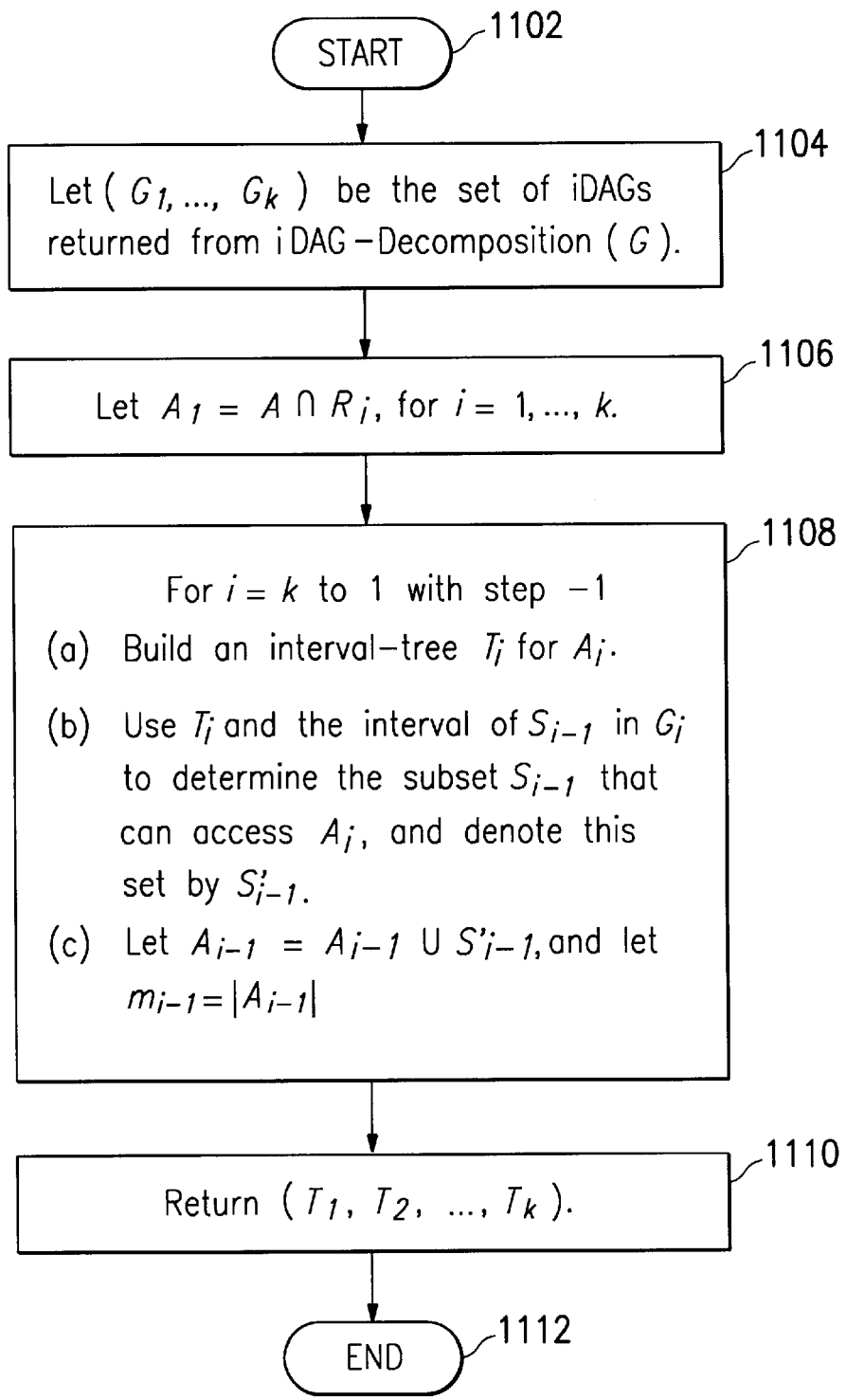
FIG. 11 is a flow diagram for decomposing an interval tree in accordance with one embodiment of the present invention.

If $A \subseteq V$ is an access set, then a method as shown in tasks 1102–1112 of FIG. 11 may be performed as follows:
Method Decomposed-Interval-Trees(G,A)
1. Let $(G_1, \ldots, G_k)$ be the set of iDAGs returned from iDAG-Decomposition (G).
2. Let $A_i = A \cap R_i$, for $i=1, \ldots, k$.
3. For $i=k$ to 1 with step $-1$
   (a) Build an interval-tree $T_i$ for $A_i$.
   (b) Use $T_i$ and the interval of $S_{i-1}$ in $G_i$ to determine the subset $S_{i-1}$ that can access $A_i$, and denote this set by $S'_{i-1}$.
   (c) Let $A_{i-1} \cup S'_{i-1}$, and let $m_{i-1} = |A_{i-1}|$ ($m_i$ will be used in the discussion below).
4. Return $(T_1, T_2, \ldots, T_k)$.

With this structure, and with $(T_1, T_2, \ldots, T_k)$, a query such as "given a vertex v, can v reach A" can be answered in approximately $O(\log(\max_{i=l}^{k} m_i))$ amount of time. Recall v will receive an identity(v) of the form $(i_v, I_v)$. The method searches in $T_{i_v}$ to determine whether $I_v$ is contained in any interval in $T_{i_v}$. In another example, suppose U 532 V is a membership set that contains n groups. Then the above query can be answered in approximately $O(n\log(\max_{i=l}^{k} m_i))$ amount of time.

Generally, decomposition minimizes interface sets because both the size of a representation and query time are monotonic functions based upon the size of the interface sets. Where possible, decomposition also minimizes the number of resultant iDAGs present after decomposition. With the decomposed iDAG representation, the identity of each vertex (group) is independent of the access set of a document. When a new document is introduced, no change to any group of information users is needed. In addition, updating users' or a user's memberships may be performed by an addition or deletion of groups to or from their current membership set.

4.2 Additional Methods for iDAG Decomposition

Because the problem of decomposing an iDAG is computationally expensive, simpler subclasses of iDAGs may be used instead of the subclasses implemented above by the present invention.

Figure 12B:
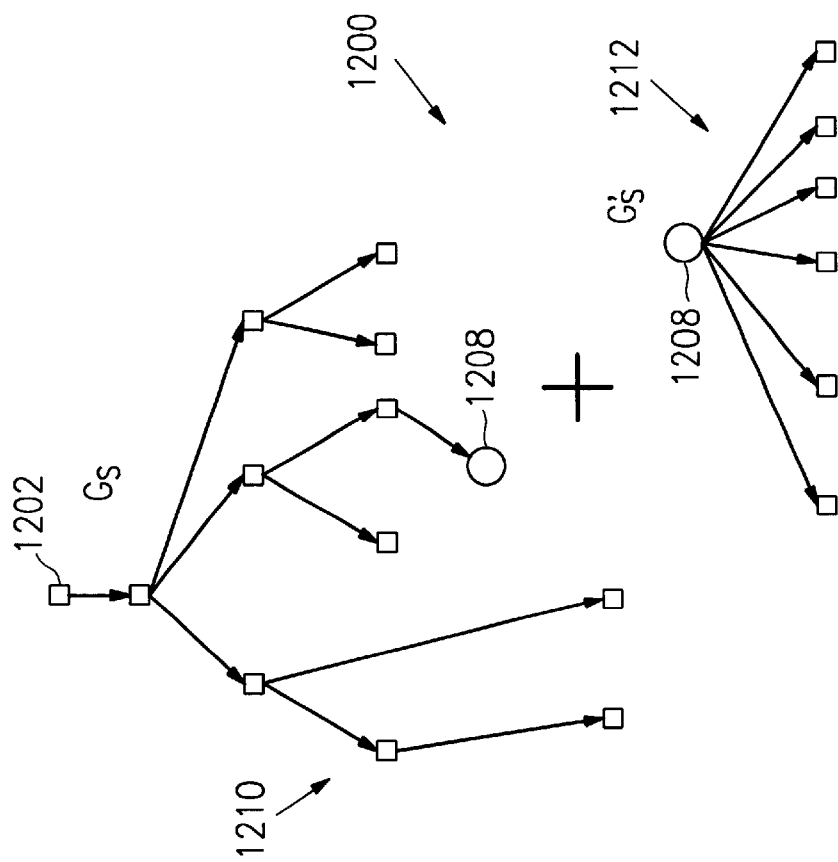
FIGS. 12A and 12B illustrate a tree decomposition of a DAG in accordance with one embodiment of the present invention.
Figure 12A:
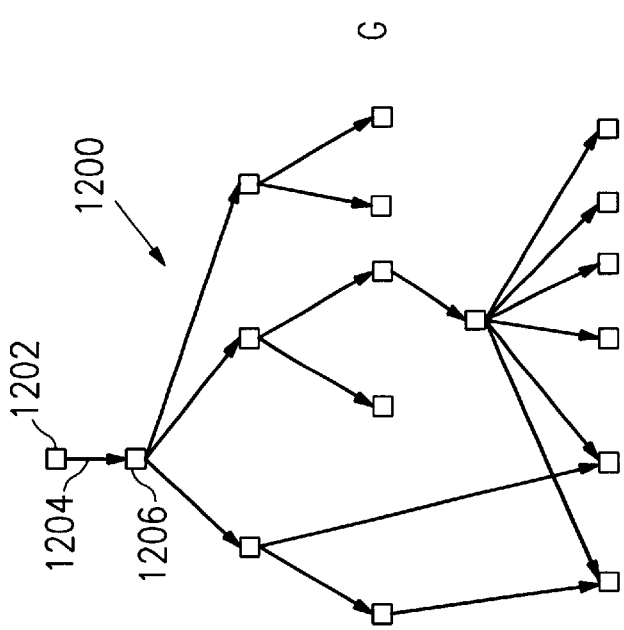

One method is to decompose a DAG into a collection of trees is shown in FIGS. 12A and 12B for DAG 1200. In this method, a depth-first search (DFS) is applied to a given DAG G starting from a source vertex shown as node 1202 (a vertex is a source vertex if its in-degree is equal to 0, where in-degree refers to a number of links entering the node with the iDAG. For example, a link 1204 is shown entering an intermediary node 1206). During DFS, if the current vertex u is directly connected to a vertex that has already been visited, then v is inserted into the interface set S. Because vertices in S are leaves in $G'_S$, it follows that $G'_S$ is a tree. Repeatedly applying this procedure on $G_S$, we obtain a decomposition. FIG. 12B shows the decomposition and resultant iDAGs for the DAG G of FIG. 12A, where an interface vertice is shown as node 1208 for iDAGs $G_S$ 1210 and $G_{S'}$ 1212.

The trees shown in FIG. 12B are the simplest kinds of iDAGs. In another embodiment, a more general iDAG decomposition may be used. As shown in section 4.1, the left-ends of any interval map of an iDAG may be a topological ordering of the DAG. In addition, it can be determined whether right-ends can be assigned to generate a valid interval map for a topological ordering.

If the input DAG is a tree, this version of the present invention's decomposition method applies a depth-first search (DFS) to order all vertices to generate a left-end assignment. For comparison purposes only, it should be noted that the breadth-first search (BFS), even though it also generates a topological ordering, often does not generate a valid left-end assignment. The DFS is applied to a given DAG G is starting from a source vertex. Incrementally, a topological ordering for G is generated together with a directed graph H as defined in Section 2.2. If a cycle is detected in H, then the method backtracks and assigns the vertex in the cycle that has the smallest topological number to the interface set S. Any connection from this vertex to all other vertices is deleted and DFS is repeated on the resulting DAG until an interval map can be generated. The resulting graph is $G'_S$. Repeatedly applying tis procedure on $G_S$ leads to a decomposition of the DAG G.

4.3 Hashtable for Hot Membership

Figure 13B:
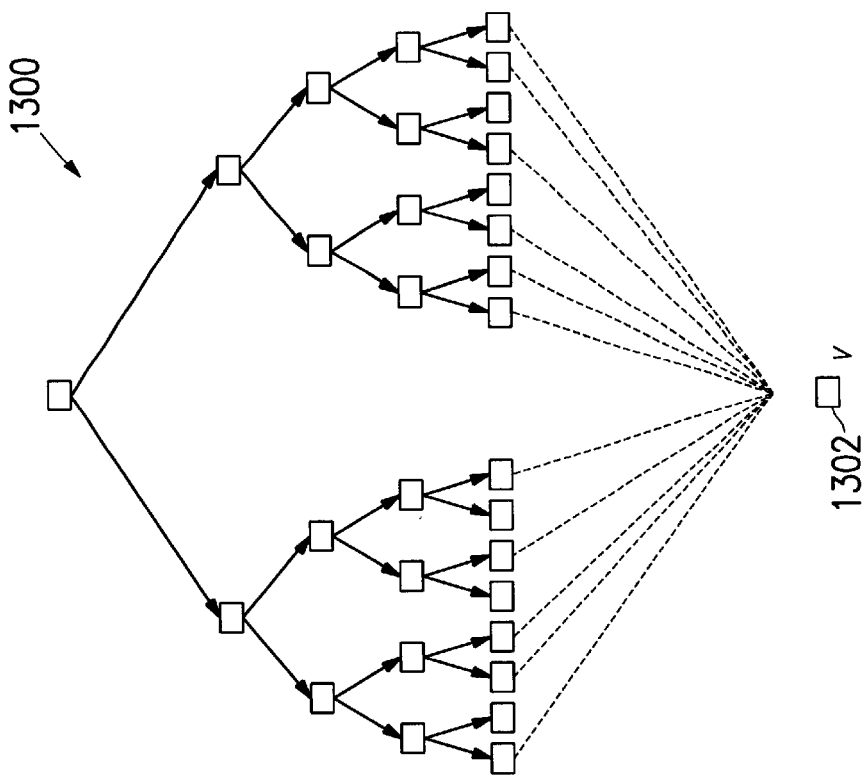
FIGS. 13A and 13B show a DAG being transformed into an iDAG for use with a hash-table method practiced in accordance with one embodiment of the present invention.
Figure 13A:
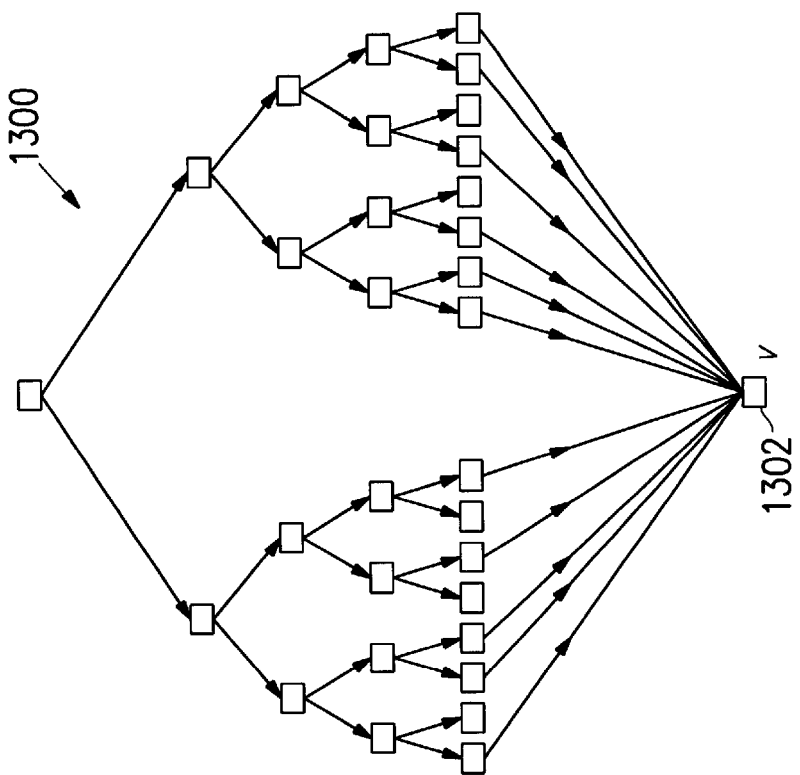

In another embodiment of the present invention, a hashtable may be used for DAGs with numerous interface vertices. For example, if a DAG 1300 shown in FIG. 13A is to be decomposed into trees, or even into more general iDAGs, the number of interface vertices will be very large because v has a large in-degree. This kind of group structures or sub-structures are commonly found in practice, for example, where the assistant secretary of the president can read almost all documents. In the following discussion, these types of vertices, shown as vertices v 1302, will be referred to as hot vertices. If v is removed form the DAG 1300 in this example, a tree that is an iDAG is obtained as shown in FIG. 13B. However, an auxiliary structure is still needed to answer a query if v in involved.

In this version of the invention, this auxiliary structure is a hashtable, that can store all vertices that can reach v or, in an alternate embodiment, all vertices that can not reach v. If the number of hot vertices encountered to answer a query is small (for example, bounded above by a small constant such as 10), the hashtable is examined to determine whether the given vertex can reach one of the hot groups that belong to a set A. If the answer is yes, the query is completed and access is allowed. In another embodiment, access would be denied. Otherwise, a structure for the DAG resulting after deleting all hot vertices is used to answer the query.

In alternate embodiments, there are two types of hot vertices v: hot leaves and hot internal vertices. For hot leaves, hashtables are built for them. For hot internal vertices, a decomposition method discussed above is used and the internal vertices are equated to interface vertices. By doing this, the hot internal vertices will be leaves in $G'_S$ and will be a source of vertices in $G_S$. Hence, when building the structure for $G'_S$, hashtables can be used for the interface vertices. In $G_S$, their in-degree is equal to zero, and therefore will not be treated as hot vertices. In another embodiment, the two DAG simplification methods discussed immediately above may be combined and used to build an access control structure, by repeatedly removing a set of hot leaves or decomposing a graph with a set of hot internal vertices as an interface, and then removing the set of hot vertices from the $G'_S$; and decomposing, using interface vertices, the DAG into two DAGs, such that one of them is an iDAG.

SIGNAL-BEARING MEDIA

In other embodiments, the methods discussed above may be implemented, for example, by operating a digital data processing apparatus to execute a sequence of machine-readable instructions. These instructions may reside in various types of signal-bearing media. In this respect, one aspect of the present invention concerns a programmed product, comprising signal-bearing media tangibly embodying a program of machine-readable instructions executable by a digital data processor to perform a method to regulate access to a systems database.

Figure 14:
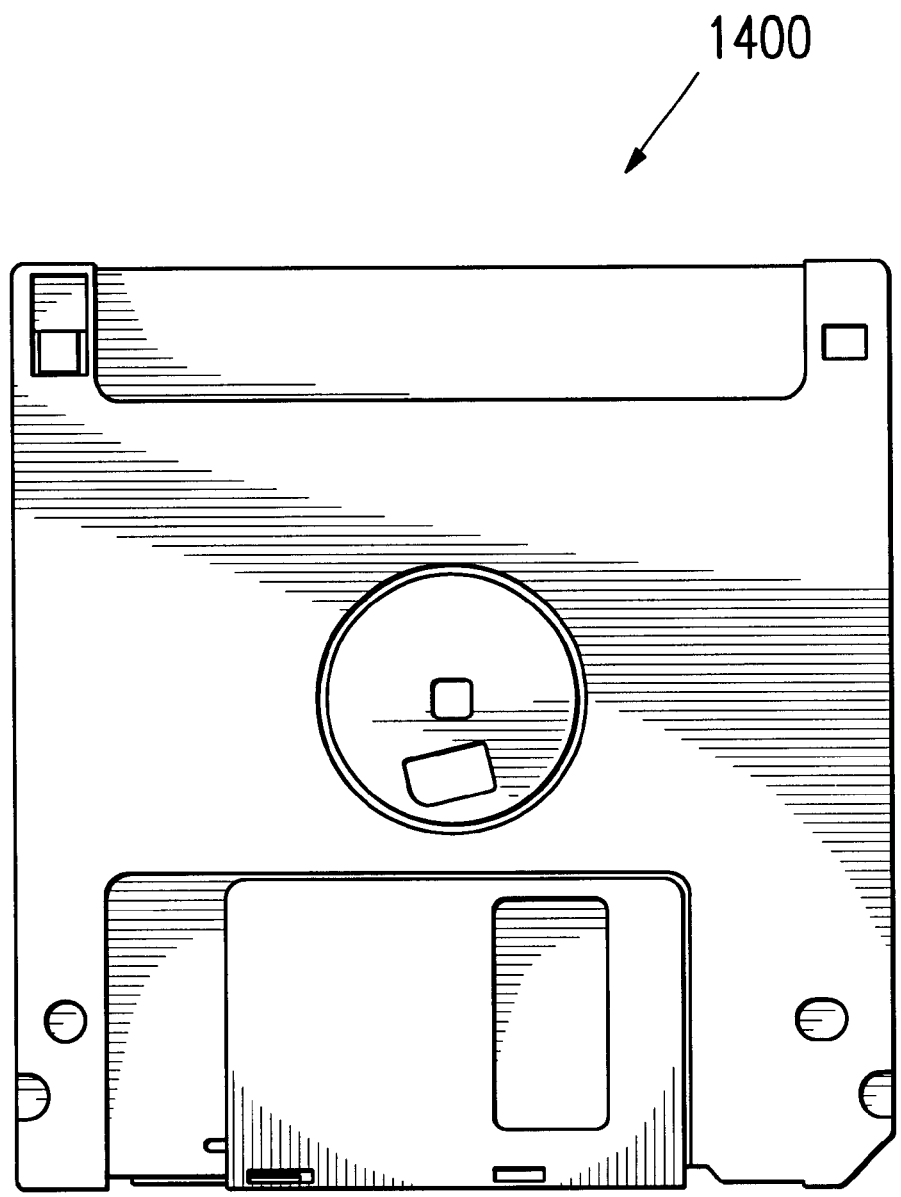
FIG. 14 is a perspective view of an exemplary signal-bearing medium in accordance with the invention.

This signal-bearing media may comprise, for example, RAM (not shown) contained within the digital data processing apparatus. Alternatively, the instructions may be contained in another signal-bearing media, such as a magnetic data storage diskette 1400 (FIG. 14), directly or indirectly accessible by the processing apparatus. Whether contained in this apparatus or elsewhere, the instructions may be stored on a variety of machine-readable data storage media, such as DASD storage (e.g., a conventional "hard drive" or a RAID array), magnetic tape, electronic read-only memory (e.g., ROM, CD-ROM, EPROM, or EEPROM), an optical storage device (e.g., CD-ROM, WORM, DVD, digital optical tape), paper "punch" cards, or other suitable signal-bearing media including transmission media such as digital and analog and communication links and wireless. In an illustrative embodiment of the invention, the machine-readable instructions may comprise lines of compiled C, $C^+$, $C^{++}$, or other language code.

HARDWARE COMPONENTS & INTERCONNECTIONS

Figure 15:
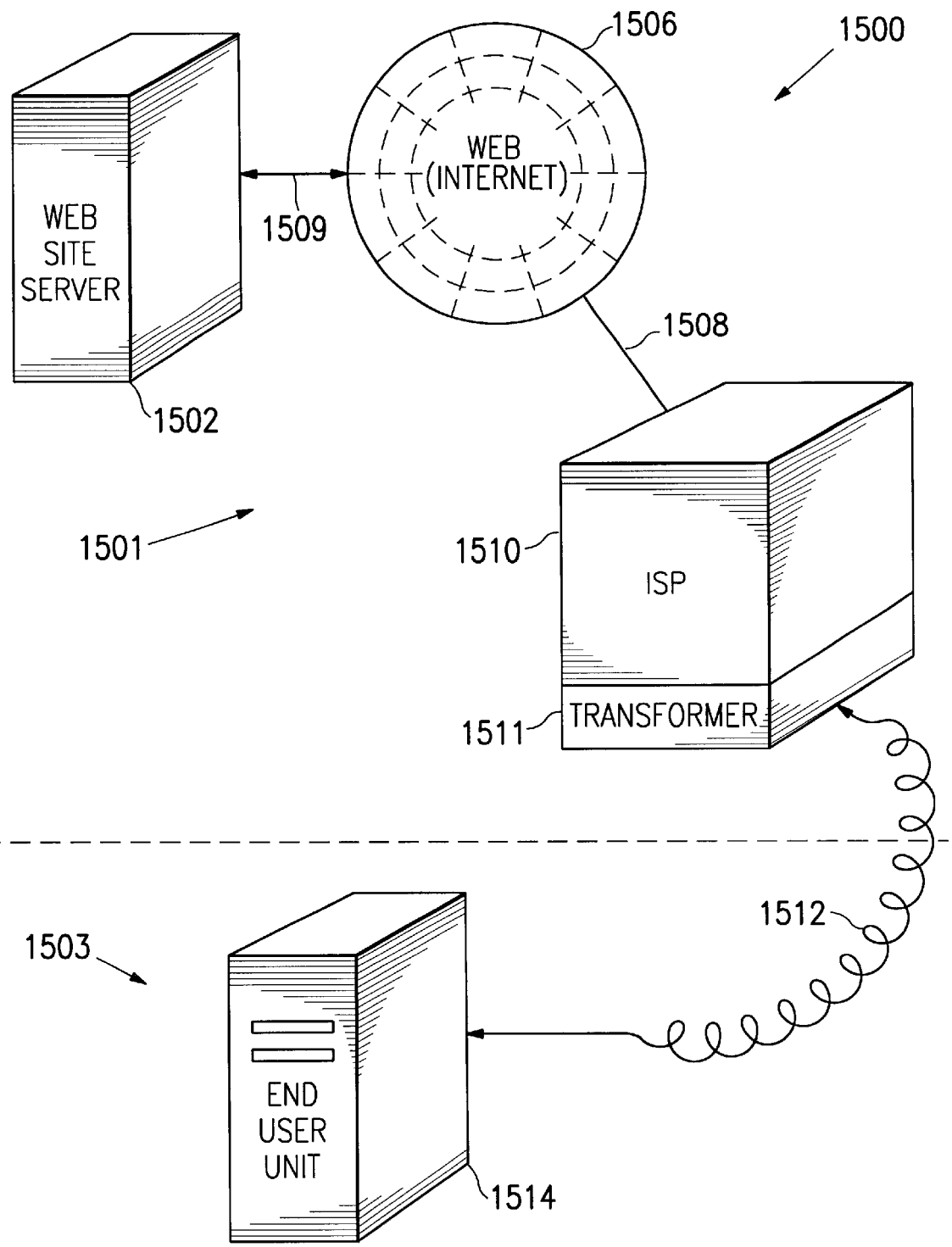
FIG. 15 is a block diagram of the hardware components and interconnections of a digital signal processing apparatus in accordance with the invention.

The digital data processing apparatus used to execute a sequence of machine readable instructions as referred to above may be embodied by various hardware components and interconnections as described in FIG. 15.

In FIG. 15, the Internet system 1500 as shown comprises two parts, a first system 1501 and a second system 1503. The first system 1501 may include a web site server 1502 communicatively connected via a web 1506 to an Internet service provider (ISP) 1510 using communication channels 1508 and 1509. Commonly, these types of communication channels are fast-link channels. The server 1502 may act as a host location for data objects such as media or multimedia objects. In one embodiment, the server 1502 may be a mainframe computer manufactured by the International Business Machines Corporation of Armonk, N.Y., and may use an operating system sold under trademarks such as MVS. Or, the server 1502 may be a Unix computer, or OS/2 server, or Windows NT server or IBM RS/6000 530 workstation with 128 MB of main memory running AIX 3.2.5. The server 1502 may incorporate a database system, such as DB2, IMS, or ORACLE, or it may access data on files stored on a data storage medium such as a WORM or disk, e.g., a 2 GB SCSI, 3.5" drive, or tape.

In another embodiment, the web site server 1502 may comprise one or more magnetic data storage disks commonly referred to as direct access storage devices (DASD). As is well known in the art, the data objects may be stored by the server 1502 in various formats depending upon the type of media.

The ISP 1510 may be connected to the second system 1503 comprising an end-user unit 1514 via a communication media 1512, commonly a slow-link channel, where the ISP 1510 controls the passage of information between the web site server 1502 and the user unit 1514. "Fast-link" and "slow-link", as mentioned above, refer to the relative speed with which the communication channels 1508, 1509, and 1512 can transfer a data object. In any case, the object transfer capabilities of the fast-link channel generally exceed those of the slow-link channel, and one or both links may comprise a line, bus, cable, electromagnetic link, microwave, radio signal, or other wireless means for exchanging commands, media objects, and other information and data between the web site server 1502, the ISP 1510, and the user unit 1516.

Among other features, the ISP 1510 may include a fire wall used as a means of reducing the risk of unwanted access to the user unit 1514. Although the ISP 1510 is pictured as a separate device, the ISP may be integral to the user unit 1514. The ISP 1510 may also include a transformer 1511 that may be used to transform a media object and set and/or to implement transfer parameters to facilitate efficient transfer of a media object between the ISP 1510 and the user unit 1514. In another embodiment, the ISP 1510 and the transformer 1511 may be eliminated from the system 1500, the ISP 1510 may be eliminated and the transformer 1511 integrate into the web site server 1502 or be included within the second system 1503 rather than the first system 1501 as shown.

The end user unit 1514 may include a processing unit (not shown), such as a microprocessor or other processing machine, communicatively coupled to a storage unit. The storage unit may also include a fast-access memory and may include nonvolatile storage (not shown). The fast-access memory preferably comprises random access memory, and may be used to store the programming instructions executed by the processing unit during execution of a computer program. The nonvolatile storage may comprise, for example, one or more magnetic data storage disks such as a "hard drive" or any other suitable storage device. Further, the end user unit 1514 may include in one embodiment an output module for outputting or displaying program results on a graphic display, print device or storage medium.

Despite the specific foregoing description, ordinarily skilled artisans (having the benefit of this disclosure) will recognize that the apparatus discussed above may be implemented in a machine of different construction, without departing from the scope of the invention. As a specific example, one of the components such as ISP 1510 may be eliminated; furthermore, the ISP 1510 may be integral to the end user unit 1514, or it may include a web site server 1502. Regardless of the configuration of the web site server 1502, the server includes at least one web site having a web site topology.

OTHER EMBODIMENTS

While there have been shown what are presently considered to be preferred embodiments of the invention, it will be apparent to those skilled in the art that various changes and modifications can be made herein without departing from the scope of the invention as defined by the appended claims.

We claim:

1. A method to regulate access to a system's database using interval containment control, comprising:

allowing a first group $g_m$ comprising one or more data requesters access to a data object contained in the database;

mapping $g_m$ to a first interval value and a second group $g_n$ to a second interval value, wherein $g_n$ contains at least one data requester U; and allowing U access to the data object if the second interval value for $g_n$ is contained within the first interval value for $g_m$.

2. The method recited in claim 1, wherein mapping to an interval value comprises mapping to an integer interval value, wherein b and e are integers defining the second interval and $b \leq e$, wherein b' and e' are integers defining the first interval and $b' \leq e'$ and wherein the second interval is contained within the first interval if ($b' \leq b \leq e \leq e'$).

3. The method recited in claim 2, further comprising using a mapping means for mapping an integer interval value to a group.

4. The method recited in claim 2, further comprising mapping groups to an integer interval value, the integer interval value expressed as an interval over integers.

5. The method recited in claim 4, the mapping maintaining a hierarchial relationship within a group partial order of groups.

6. The method recited in claim 5, the group partial order being maintained wherein G is a set of groups $\{g_1, g_2, \ldots g_m\}$ and $\pi$ represents a mapping from G to an integer interval value, and $\pi$ respects a group partial order <G of GROUP if for each pair of groups of g, h ∈ G, $g < G^h$ if $\pi(g) <_f \pi(h)$, and $\pi$ respects a group partial order >G of GROUP if for each pair of groups g, h ∈ G, $g > G^h$ if $\pi(g) <_f \pi(h)$.

7. The method recited in claim 3, further comprising ordering a collection of integer interval values to define a hierarchial relationship between integer interval values in the collection.

8. The method recited in claim 7, further comprising using an ordering means for defining the hierarchial relationship.

9. The method recited in claim 4, further comprising ordering a collection of integer interval values to define a hierarchial relationship between integer interval values in the collection.

10. The method recited in claim 9, further comprising using an ordering means for defining the hierarchial relationship.

11. A method to regulate access to an object in a database by decomposing a directed acyclic graph representing a hierarchial structure of integer interval values (iDAG), each value mapped to a group, comprising:

decomposing the iDAG into multiple directed acyclic graphs (DAG) $G_S$ and $G_1$ having an overlap, wherein $G_1 = G'_S$ and wherein $G'_S$ is an iDAG and $G_S$ is a simplified DAG; and recursively repeating the decomposition on $G_S$, wherein $(G_2 = G_S'' \ldots, G_k = G_S^k)$ formed by the recursion and are iDAGs, and wherein $G_i$ is a newly formed iDAG comprising $(G_S' \ldots, G_S^k)$ and structured by hierarchial order.

12. The method recited in claim 11, further comprising generating an interval-map for $G_i$ using a mapping means where $1 \leq i \leq k$.

13. The method recited in claim 12, further comprising:

allowing a group $g_1$ having an interval A access to the object in the database; and allowing a group $g_2$ having an interval B access to the object if the interval of B is contained within the interval of A.

14. A method to regulate access to an object in a database, comprising:

decomposing a directed acyclic graph (DAG) G having nodes and leaves into a collection of DAGs having nodes and leaves, each DAG in the collection being simpler in structure than G;

mapping a group g to a DAG in the collection; and using a query structure of the DAG to decide if g may access the object.

15. The method recited in claim 14, wherein the query structure comprises an interval over integer mapping to each g and comparison.

16. The method recited in claim 14, wherein the query structure comprises a hash table listing all gs allowed access to the object, and a group $g_i$ is compared to all groups in the hash table.

17. The method recited in claim 15, a DAG in the collection being more simply structured if it has less nodes or leaves than G.

18. The method recited in claim 16, a DAG in the collection being more simply structured if it has less nodes or leaves than G.

19. A signal-bearing medium tangibly embodying a program of machine-readable instructions executable by a digital processing apparatus to perform a method to regulate access to a system's database, said method comprising:

allowing a first group $g_m$ access to a data object contained in the database;

mapping $g_m$ to a first interval value and a second group $g_n$ to a second interval value, wherein $g_n$ contains at least one user member U; and allowing U access to the data object if the second interval value for $g_n$ is contained within the first interval value for $g_m$.

20. The method recited in claim 19, wherein mapping to an interval value comprises mapping to an integer interval value, wherein b and e are integers defining the second interval and $b \leq e$, wherein b' and e' are integers defining the first interval and $b' \leq e'$, and wherein the second interval is contained within the first interval if ($b' \leq b \leq e \leq e'$).

21. The medium recited in claim 20, the method embodied thereon further comprising using a mapping means for mapping an integer interval value to a group.

22. The medium recited in claim 20, the method embodied thereon further comprising mapping groups to an integer interval value, the integer interval value expressed as an interval over integers.

23. The medium recited in claim 22, wherein mapping maintains a hierarchial relationship within a group partial order of groups.

24. The medium recited in claim 23, the group partial order being maintained wherein G is a set of groups {$g_1$, $g_2, \ldots g_M$} and $\pi$ represents a mapping from G to an integer interval value, and $\pi$ respects a group partial order <G of GROUP if for each pair of groups of g, h ∈ G, g<$G^h$ if $\pi(g)<_I \pi(h)$, and $\pi$ respects a group partial order >G of GROUP if for each pair of groups g, h ∈ G, g>$G^h$ if $\pi(g)<_I \pi(h)$.

25. The medium recited in claim 21, the method embodied thereon further comprising ordering a collection of integer interval values to define a hierarchial relationship between integer interval values in the collection.

26. The medium recited in claim 25, the method embodied thereon further comprising using an ordering means for defining the hierarchial relationship.

27. The medium recited in claim 22, the method embodied thereon further comprising ordering a collection of integer interval values to define a hierarchial relationship between integer interval values in the collection.

28. The medium recited in claim 27, the method embodied thereon further comprising using an ordering means for defining the hierarchial relationship.

29. A signal-bearing medium tangibly embodying a program of machine-readable instructions executable by a digital processing apparatus to perform a method to regulate access to an object in a database by decomposing a directed acyclic graph representing a hierarchial structure of integer interval values (iDAG), each value mapped to a group, said method comprising:

decomposing the iDAG into multiple directed acyclic graphs (DAG) $G_S$ and $G_1$ having an overlap, wherein $G_1=G'_S$, and wherein $G'_S$ is an iDAG and $G_S$ is a simplified DAG; and recursively repeating the decomposition on $G_S$, wherein ($G_2=G''_S, \ldots, G_k=G_S^k$) is formed by the recursion and are iDAGs, and wherein $G_i$ is a newly formed iDAG comprising ($G'_S, \ldots, G_S^k$) and structured by hierarchial order.

30. The medium recited in claim 29, the method embodied thereon further comprising generating an interval-map for $G_i$ using a mapping means where $1 \leq i \leq k$.

31. The medium recited in claim 30, the method embodied thereon further comprising:

allowing a group $g_1$ having an interval A access to the object in the database; and allowing a group $g_2$ having an interval B access to the object if the interval of B is contained within the interval of A.

32. A signal-bearing medium tangibly embodying a program of machine-readable instructions executable by a digital processing apparatus to perform a method to regulate access to a system's database, said method comprising:

decomposing a directed acyclic graph (DAG) G having nodes and leaves into a collection of DAGs having nodes and leaves, each DAG in the collection being simpler in structure than G;

mapping a group g to a DAG in the collection; and using a query structure of the DAG to decide if g may access the object.

33. The medium recited in claim 32, wherein the query structure comprises an interval over integer mapping to each g and comparison.

34. The method recited in claim 32, wherein the query structure comprises a hash table listing all gs allowed access to the object, and g is compared to all groups in the hash table.

35. The method recited in claim 33, a DAG in the collection being more simply structured if it has less nodes or leaves than G.

36. The method recited in claim 34, a DAG in the collection being more simply structured if it has less nodes or leaves than G.

37. A digital signal processing apparatus to regulate access to a system's database, comprising:

a storage unit;

a processor;

circuitry communicatively connecting the processor to the storage unit, the processor capable of executing commands and data to regulate access to any object contained in the database by:

allowing a first group $g_m$ comprising one or more data requesters access to a data object contained in the database;

mapping $g_m$ to a first interval value and a second group $g_n$ to a second interval value, wherein $g_n$ contains at least one data requester U; and allowing U access to the data object if the second interval value for $g_n$ is contained within the first interval value for $g_m$.

38. The apparatus recited in claim 37, wherein mapping to an interval value comprises mapping to an integer interval value, wherein b and e are integers defining the second interval and b≤e, wherein b' and e' are integers defining the first interval and b'≤e' and wherein the second interval is contained within the first interval if (b'≤b≤e≤e').

39. The apparatus recited in claim 38, further comprising using a mapping means for mapping an integer interval value to a group.

40. The method recited in claim 39, further comprising mapping groups to an integer interval value, the integer interval value expressed as an interval over integers.

41. The apparatus recited in claim 40, the mapping maintaining a hierarchial relationship within a group partial order of groups.

42. The apparatus recited in claim 41, the group partial order being maintained wherein G is a set of groups {$g_1$, $g_2, \ldots$ ba $g_m$} and $\pi$ represents a mapping from G to an integer interval value, and $\pi$ respects a group partial order <G of GROUP if for each pair of groups of g, h ∈ G, g<$G^h$ if $\pi(g)<_I \pi(h)$, and $\pi$ respects a group partial order >G of GROUP if for each pair of groups g, h ∈ G, g>$G^h$ if $\pi(g)<_I \pi(h)$.

43. The apparatus recited in claim 42, further comprising ordering a collection of integer interval values to define a hierarchial relationship between integer interval values in the collection.

44. The apparatus recited in claim 43, further comprising using an ordering means for defining the hierarchial relationship.

45. The apparatus recited in claim 44, further comprising ordering a collection of integer interval values to define a hierarchial relationship between integer interval values in the collection.

46. The apparatus recited in claim 45, further comprising using an ordering means for defining the hierarchial relationship.

47. A digital signal processing apparatus to regulate access to a system's database, comprising:

a storage unit;

a processor;

circuitry communicatively connecting the processor to the storage unit, the processor capable of executing commands and data to regulate access to any object contained in the database by:

decomposing the iDAG into multiple directed acyclic graphs (DAG) $G_S$ and $G_1$ having an overlap, wherein $G_1 = G'_S$ and wherein $G'_S$ is an iDAG and $G_S$ is a simplified DAG; and recursively repeating the decomposition on $G_S$, wherein $(G_2 = G_S'' \ldots, G_k = G_S^{k'})$ formed by the recursion and are iDAGs, and wherein $G_i$ is a newly formed iDAG comprising $(G_S' \ldots, G_S^{k'})$ and structured by hierarchial order.

48. The apparatus recited in claim 47, further comprising:

allowing a group $g_1$ having an interval A access to the object in the database; and allowing a group $g_2$ having an interval B access to the object if the interval of B is contained within the interval of A.

49. The apparatus recited in claim 48, further comprising:

decomposing a directed acyclic graph (DAG) G having nodes and leaves into a collection of DAGs having nodes and leaves, each DAG in the collection being simpler in structure than G;

mapping a group g to a DAG in the collection; and using a query structure of the DAG to decide if g may access the object.

50. A digital signal processing apparatus to regulate access to a system's database, comprising:

a storage unit;

a processor;

circuitry communicatively connecting the processor to the storage unit, the processor capable of executing commands and data to regulate access to any object contained in the database by:

decomposing a directed acyclic graph (DAG) G having nodes and leaves into a collection of DAGs having nodes and leaves, each DAG in the collection being simpler in structure than G;

mapping a group g to a DAG in the collection; and using a query structure of the DAG to decide if g may access the object.

51. The digital signal processing apparatus recited in claim 50, wherein the query structure comprises an interval over integer mapping to each g and comparison.

52. The digital signal processing apparatus recited in claim 51, wherein the query structure comprises a hash table listing all $g_S$ allowed access to the object, and a group $g_i$ is compared to all groups in the hash table.

53. The digital signal processing apparatus recited in claim 50, further comprising a DAG in the collection being more simply structured if it has less nodes or leaves than G.

54. The digital signal processing apparatus recited in claim 51, further comprising a DAG in the collection being more simply structured if it has less nodes or leaves than G.

55. A digital signal processing apparatus to regulate access to a system's database, comprising:

a storage means for storing digital signals;

a processor means for interpreting digital signals to regulate access to any object contained in the database by:

allowing a first group $g_m$ comprising one or more data requesters access to a data object contained in the database;

mapping $g_m$ to a first interval value and a second group $g_n$ to a second interval value, wherein $g_n$ contains at least one data requester U; and allowing U access to the data object if the second interval value for $g_n$ is contained within the first interval value for $g_m$; and circuitry means for communicatively coupling the storage means to the processor means.

56. The apparatus recited in claim 55, wherein mapping to an interval value comprises mapping to an integer interval value, wherein b and e are integers defining the second interval and $b \leq e$, wherein b' and e' are integers defining the first interval and $b' \leq e'$ and wherein the second interval is contained within the first interval if ($b' \leq b \leq e \leq e'$).

57. The apparatus recited in claim 56, further comprising a module means for displaying status and query results.

* * * * *

UNITED STATES PATENT AND TRADEMARK OFFICE
CERTIFICATE OF CORRECTION

PATENT NO. : 6,219,667 B1  
DATED : April 17, 2001  
INVENTOR(S) : Lu et al.

Page 1 of 1

It is certified that error appears in the above-identified patent and that said Letters Patent is hereby corrected as shown below:

<u>Column 4,</u>  
Line 19, should read, -- $g$ among these access groups that can be expressed as a --  
Line 20, should read, -- DAG over this set of access groups as shown in FIG. 1. Call --

Signed and Sealed this

Thirteenth Day of November, 2001

*Attest:*

NICHOLAS P. GODICI  
*Attesting Officer*  *Acting Director of the United States Patent and Trademark Office*